(12) United States Patent
Osogami

(10) Patent No.: US 10,599,976 B2
(45) Date of Patent: Mar. 24, 2020

(54) UPDATE OF ATTENUATION COEFFICIENT FOR A MODEL CORRESPONDING TO TIME-SERIES INPUT DATA

(71) Applicant: INTERNATIONAL BUSINESS MACHINES CORPORATION, Armonk, NY (US)

(72) Inventor: Takayuki Osogami, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 15/344,935

(22) Filed: Nov. 7, 2016

(65) Prior Publication Data

US 2018/0129968 A1    May 10, 2018

(51) Int. Cl.
*G06N 3/04*    (2006.01)

(52) U.S. Cl.
CPC ........... *G06N 3/0445* (2013.01); *G06N 3/049* (2013.01); *G06N 3/0472* (2013.01)

(58) Field of Classification Search
CPC ..... G06N 3/0445; G06N 3/0472; G06N 3/049
See application file for complete search history.

(56) References Cited

U.S. PATENT DOCUMENTS

| | | | | |
|---|---|---|---|---|
| 6,965,885 B2 * | 11/2005 | Gutta | ...................... | G06N 3/08 706/26 |
| 8,849,735 B2 * | 9/2014 | Izhikevich | ............. | G06N 3/049 706/25 |
| 9,076,107 B2 | 7/2015 | Cameron et al. | | |
| 2007/0194727 A1 * | 8/2007 | McKinstry | ........... | G05B 13/026 318/53 |
| 2016/0012330 A1 | 1/2016 | Pescianschi | | |
| 2016/0092767 A1 | 3/2016 | Osogami et al. | | |

OTHER PUBLICATIONS

Jacobs, Robert A. "Increased rates of convergence through learning rate adaptation." Neural networks 1.4 (1988): 295-307. (Year: 1988).*

Osogami, Takayuki, and Makoto Otsuka. "Learning dynamic Boltzmann machines with spike-timing dependent plasticity." arXiv preprint arXiv:1509.08634 (2015). (Year: 2015).*

(Continued)

*Primary Examiner* — Eric Nilsson
*Assistant Examiner* — Sehwan Kim
(74) *Attorney, Agent, or Firm* — Tutunjian & Bitetto, P.C.; Vazken Alexanian

(57) ABSTRACT

Provided are a computer program product, a learning apparatus and a learning method. The method includes calculating, by a processor, a first propagation value that is propagated from a propagation source node to a propagation destination node in a neural network including a plurality of nodes, based on node values of the propagation source node at a plurality of time points and a weight corresponding to passage of time points based on a first attenuation coefficient. The method further includes updating, by the processor, a first update parameter, which is used for updating the first attenuation coefficient, by using the first propagation value. The method also includes updating, by the processor, the first attenuation coefficient by using the first update parameter and an error of the node value of the propagation destination node.

20 Claims, 11 Drawing Sheets

(56) References Cited

OTHER PUBLICATIONS

Wijekoon, Jayawan HB, and Piotr Dudek. "VLSI circuits implementing computational models of neocortical circuits." Journal of neuroscience methods 210.1 (2012): 93-109. (Year: 2012).*

Hallak, Assaf, et al. "Generalized emphatic temporal difference learning: Bias-variance analysis." Thirtieth AAAI Conference on Artificial Intelligence. 2016. (Year: 2016).*

Kato, Ayaka, and Kenji Morita. "Forgetting in reinforcement learning links sustained dopamine signals to motivation." PLoS computational biology 12.10 (2016): e1005145. (Year: 2016).*

Hinton, G., "A Practical Guide to Training Restricted Boltzmann Machines" Department of Computer Science, University of Toronto (Aug. 2, 2010) pp. 1-21.

Osogami, T. et al., "Seven neurons memorizing sequences of alphabetical images via spike-timing dependent plasticity" Scientific Reports (Sep. 2015) pp. 1-13, vol. 5, No. 14149.

* cited by examiner

UPDATE OF ATTENUATION COEFFICIENT FOR A MODEL CORRESPONDING TO TIME-SERIES INPUT DATA

BACKGROUND

Technical Field

The present invention generally relates to information processing and more particularly to updating an attenuation coefficient for a model corresponding to time-series input data.

Description of the Related Art

Conventionally, it has been known that neural networks, dynamic Boltzmann machines, and the like are capable of learning models corresponding to time-series input data. In particular, it is expected that a dynamic Boltzmann machine can realize a high learning ability using machine learning.

When learning such a model corresponding to time-series input data, coefficients have been used that increase or decrease in time-series based on a predetermined expression, rate of change, or the like. However, when such a coefficient is used, there are cases where the learning time fluctuates significantly according to the initial value of the coefficient, and in such cases, it has been necessary to set a suitable initial value for the coefficient.

SUMMARY

According to an aspect of the present invention, provided are a computer program product, a learning apparatus and a learning method. The method includes calculating, by a processor, a first propagation value that is propagated from a propagation source node to a propagation destination node in a neural network including a plurality of nodes, based on node values of the propagation source node at a plurality of time points and a weight corresponding to passage of time points based on a first attenuation coefficient. The method further includes updating, by the processor, a first update parameter, which is used for updating the first attenuation coefficient, by using the first propagation value. The method also includes updating, by the processor, the first attenuation coefficient by using the first update parameter and an error of the node value of the propagation destination node.

The summary clause does not necessarily describe all necessary features of the embodiments of the present invention. The present invention can also be a sub-combination of the features described above.

DETAILED DESCRIPTION

Hereinafter, some embodiments of the present invention will be described. The embodiments do not limit the invention according to the claims, and all the combinations of the features described in the embodiments are not necessarily essential to means provided by aspects of the invention.

Figure 1:
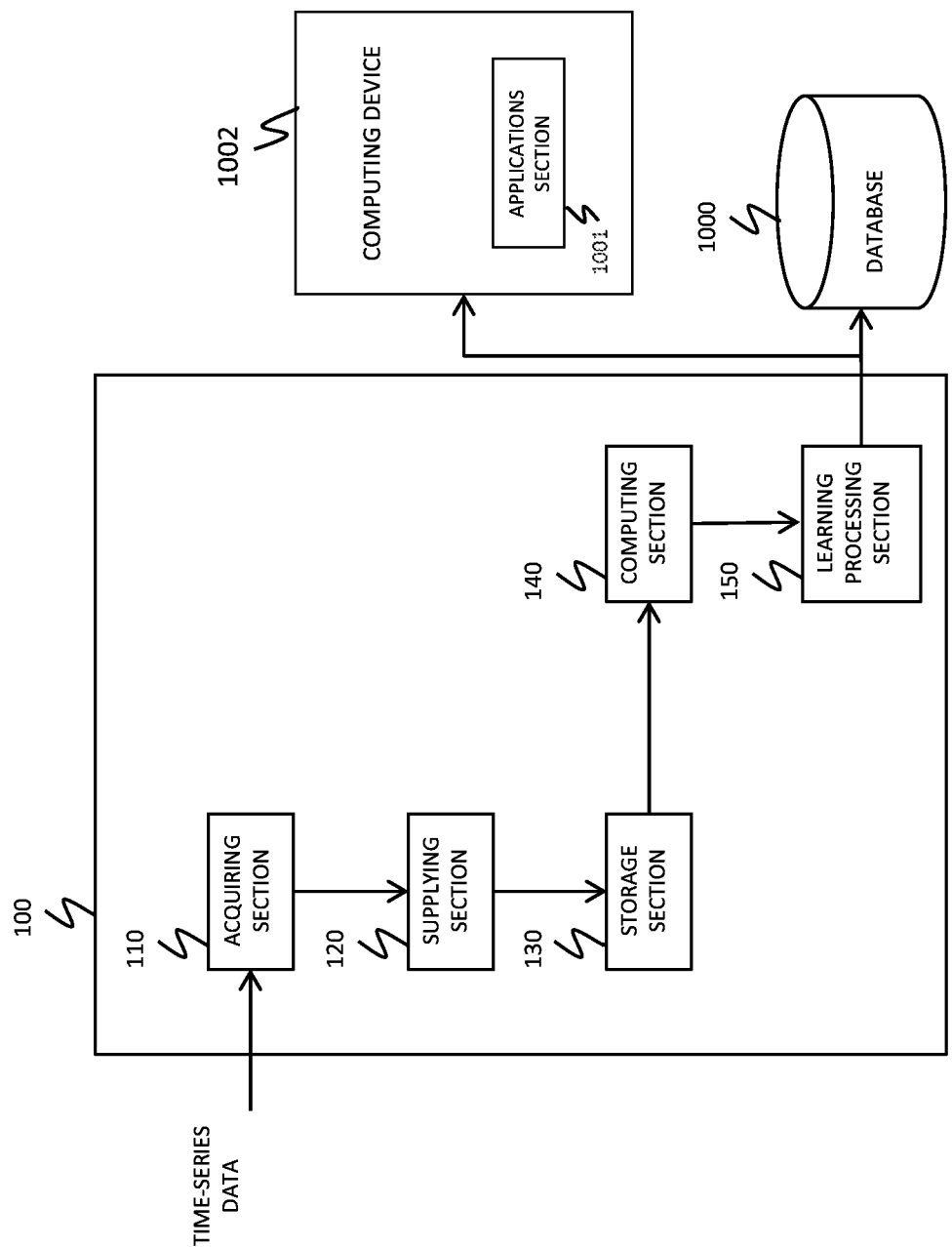
FIG. 1 shows an exemplary configuration of a learning apparatus 100 according to an embodiment.

FIG. 1 shows an exemplary configuration of a learning apparatus 100 according to an embodiment. The learning apparatus 100 can be an apparatus for learning a model 10 corresponding to time-series input data. The learning apparatus 100 can be operable to learn a model based on a Boltzmann machine by supplying time-series data to nodes of the model. The learning apparatus 100 includes an acquiring section 110, a supplying section 120, a storage section 130, a computing section 140, and a learning processing section 150.

The acquiring section 110 can be operable to acquire time-series input data. Time-series input data can be, for example, a data sequence in which a plurality of pieces of data are arranged along a time axis, such as moving image data. The acquiring section 110 can be connected to a device operated by a user or a device (sensor) that detects and outputs time-series data and can acquire the time-series input data from such a device. Alternatively, the acquiring section 110 can read and acquire time-series input data stored in a storage device in a predetermined format. Alternatively, the acquiring section 110 can be connected to a network and acquire time-series input data via the network. The acquiring section 110 can also store the acquired time-series input data in a storage device included in the learning apparatus 100.

The supplying section 120 can be operable to supply a plurality of input values corresponding to input data at one time point in the time-series input data to a plurality of nodes of a model. The supplying section 120 is connected to the acquiring section 110 and can handle, as training data, input data at one time point in the received time-series input data and supply input values at the one time point to corresponding nodes of the model. Input data at one time point can be the temporally newest data in a training data set for use in learning. Alternatively, input data at one time point can be temporally intermediate data in a training data set for use in learning. That is, input data at one time point can be selected arbitrarily from the time-series data.

The storage section 130 can be operable to store values of hidden nodes of the model in correspondence with a plurality of time points in the time-series input data. The storage section 130 can sample the values of hidden nodes corresponding to one time point and store these values in the hidden nodes corresponding to this time point. The storage section 130 can store the sampled values respectively in the hidden nodes corresponding to the time points for each time point.

The computing section 140 can be operational to compute a conditional probability of each input value at one time point on a condition that an input data sequence has occurred. Here, in the time-series input data, the pieces of data input to the respective nodes of the model at one time point are referred to as input values at one time point, and the pieces of data input to the respective nodes at the time points before the one time point are referred to as the input data sequence. A model used by the learning apparatus 100 can have a weight parameter between (i) a plurality of hidden nodes and a plurality of input values corresponding to input data at each time point prior to the one time point in an input data sequence and (ii) a plurality of hidden nodes corresponding to the one time point and a plurality of input nodes.

The computing section 140 can be operable to compute a conditional probability of each input value at one time point, on the basis of an input data sequence before the one time point in the time-series input data, the stored values of hidden nodes, and the weight parameter of the model. Furthermore, the computing section 140 can be operable to compute a conditional probability of the value of each hidden node at one time point on a condition that an input data sequences has occurred, based on an input data sequence before the one time point in the time-series input data and the weight parameter of the model.

The learning processing section 150 can be operable to increase a conditional probability of input data at one time point occurring on a condition that the input data sequence has occurred, by adjusting the weight parameter of the model. The learning processing section 150 can further adjust bias parameters which are given respectively to the plurality of nodes and hidden nodes of the model. The learning processing section 150 can supply the adjusted weight parameter and bias parameters of the model to a storage device, such as an external database 1000, to store these parameters in the storage device.

The above-described learning apparatus 100 according to the present embodiment can be operable to learn the model by adjusting the weight parameter and bias parameters of the model, based on input data at one time point in the time-series input data. Further, the learning apparatus 100 can be used to perform learning functions in applications such as optical character recognition, computer vision, junk e-mail filtering applications and search engine applications through interaction with the applications section 1001. The applications can be on a computing device 1002, such as a cell or mobile device or other computer. The model according to the present embodiment is described with reference to FIG. 2.

Figure 2:
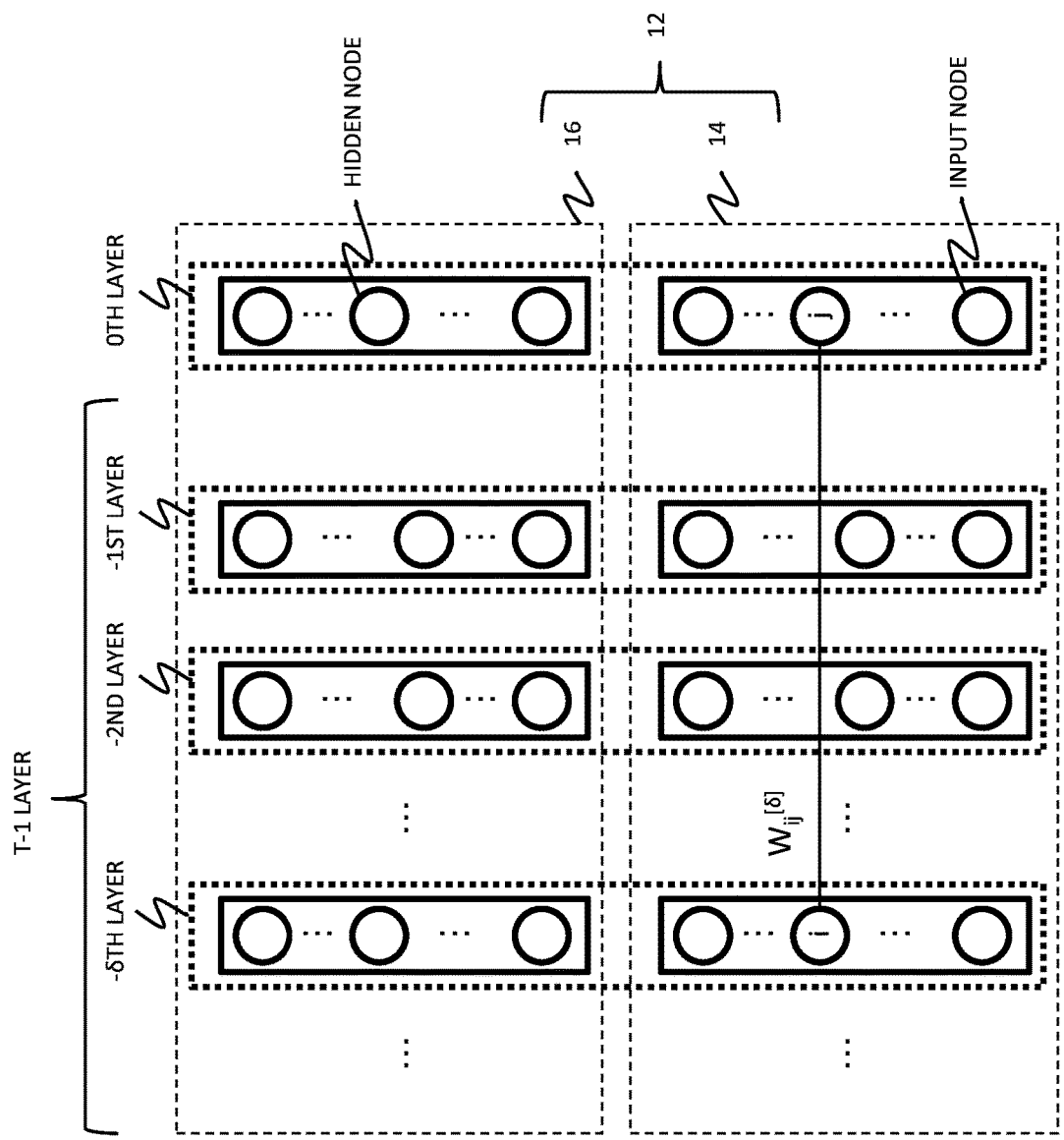
FIG. 2 shows an exemplary configuration of a model 10 according to an embodiment.

FIG. 2 shows an exemplary configuration of a model 10 according to the present embodiment. The model 10 includes a plurality of common layers 12. FIG. 2 shows an example including a total of T common layers 12. The model 10 can include a finite number of common layers 12. Each common layer 12 includes an input layer 14 and a hidden layer 16.

Each input layer 14 can be a layer corresponding to the time-series data. Each input layer 14 can correspond to a respective time point in the time-series data. Each input layer 14 can include a predetermined number of nodes. For example, the 0-th input layer can be a layer corresponding to input data at one time point in the time-series data. The 0-th input layer can include a plurality of nodes corresponding to the number of input values in this input data.

A total of T-1 input layers 14 other than the 0-th input layer 14 among the plurality of input layers can be input layers 14 corresponding to the input data sequence before the one time point in the time-series input data. For example, the −1st input layer can correspond to input data at a time point that temporally precedes the one time point by one time point, and the (−δ)-th input layer can correspond to input data at a time point that temporally precedes the one time point by δ time points. That is, a total of T-1 input layers other than the 0-th input layer each have the same number of nodes as the 0-th input layer and are respectively supplied with input values of corresponding input data values in the input data sequence, for example.

Each hidden layer 16 can correspond to a respective time point in the time-series data. For example, the 0-th hidden layer can be a layer corresponding to one time point in the time-series data. FIG. 2 shows an example including a total of T hidden layers 16. Each hidden layer 16 can include one or more hidden nodes, and the storage section 130 can store the values sampled at the one time point.

A total of T-1 hidden layers other than the 0-th hidden layer among the plurality of hidden layers 16 can be hidden layers 16 corresponding to time points before the one time point in the time-series data. For example, the −1st hidden layer corresponds to a time point that temporally precedes the input data of the one time point by one time point, and the storage section 130 stores the values sampled at the time point that temporally precedes the one time point by one time point. Furthermore, the (−δ)-th hidden layer can correspond to a time point that temporally precedes the input data of the one time point by δ time points, and the storage section 130 can store the values sampled at the time point that temporally precedes the one time point by δ time points. That is, a total of T-1 hidden layers other than the 0-th hidden layer each have the same number of nodes as the 0-th hidden layer and are respectively supplied with values of corresponding hidden nodes, for example.

As an example, in the case where the time-series input data is moving image data, the last image data of the moving image data corresponds to the 0-th input layer, and a plurality of nodes of the 0-th input layer each receive corresponding pixel data of the image data. Furthermore, the 0-th hidden layer corresponds to the final time point of the moving image data, and the storage section 130 can store values sampled at this final time point in the hidden nodes of the 0-th hidden layer.

In addition, the −1st input layer is supplied with image data that immediately precedes the last image data, and a plurality of nodes of the −1st input layer each receive corresponding pixel data of the immediately preceding image data. Furthermore, the −1st hidden layer corresponds to the time point that immediately precedes the final time point, and for each of the plurality of nodes of the −1st hidden layer, the storage section 130 can store the values sampled at this immediately preceding time point. Similarly, the plurality of nodes of the (−δ)-th input layer each receive corresponding pixel data of image data that precedes the last image data by δ images, and the plurality of nodes of the (−δ)-th hidden layer each store corresponding sampling values at the time point that precedes the last time point by δ time points.

FIG. 2 shows an example in which each common layer 12 includes an input layer 14 and a hidden layer 16, but instead, one or more common layers 12 need not include a hidden layer 16. In such a case, the 0-th common layer to the (−m)-th common layer include input layers 14 and hidden layers 16, and the (−m−1)-th common layer to (−T+1)-th common layer can include input layers 14.

The plurality of nodes in the 0-th input layer and/or the plurality of hidden nodes in the 0-th hidden layer can each have a bias parameter. For example, the j-th node j in the common layer 12 has a bias parameter $b_j$.

The plurality of nodes in the 0-th input layer and the nodes of the hidden layer corresponding to the input data sequence and layers corresponding to the input data sequence before the one time point can respectively have weight parameters therebetween. There need not be weight parameters between the plurality of nodes in each input layer 14 and hidden layer 16.

Similarly, the plurality of nodes in the 0-th hidden layer and the nodes of the hidden layer corresponding to the input data sequence and layers corresponding to the input data sequence before the one time point can respectively have weight parameters therebetween. That is, the plurality of nodes of the 0-th common layer and the nodes of the plurality of common layers before the one time point can respectively have weight parameters therebetween.

FIG. 2 shows a concept of a weight parameter $W_{ij}^{[\delta]}$ between the node j of the 0-th input layer and a node i of the $(-\delta)$-th layer. FIG. 2 shows an example in which the model 10 has the same number of input layers 14 and layers 16, each input layer 14 includes I nodes, and each hidden layer 16 includes H hidden nodes. In the present embodiment, the input layers 14 and hidden layers 16 are expressed by one common layer 12 that has a plurality of nodes $x_j^{[t]}$. The first to I-th nodes ($1 \leq j \leq I$) of the common layer 12 indicate the nodes of the input layer 14, and the (I+1)-th to (I+H)-th nodes (I+1, j, I+H) indicate hidden nodes.

For example, the weight parameter $W_{ij}^{[\delta]}$ shown in FIG. 2 indicates a weight parameter between two nodes of an input layer 14. Similarly, the weight parameter $W_{ij}^{[\delta]}$ can include weight parameters from an input node to a hidden node, from a hidden node to an input node, and between to hidden nodes. A specific example of a weight parameter $W_{ij}^{[\delta]}$ is as shown in the Expression below. In the present embodiment, a weight parameter from an input node or hidden node to an input node is referred to as a "weight parameter to an input node," and a weight parameter from an input node or hidden node to a hidden node is referred to as a 'weight parameter to a hidden node.'

$$W_{ij}^{[\delta]} = \hat{w}_{ij}^{[\delta]} + \check{w}_{ij}^{[-\delta]} \quad \text{Expression 1}$$

$$\hat{w}_{ij}^{[\delta]} = \begin{cases} 0 & \text{if } \delta = 0 \\ \sum_{k \in K} u_{i,j,k} \lambda_k^{\delta - d_{ij}} & \text{if } \delta \geq d_{ij} \\ \sum_{l \in L} -v_{i,j,l} \mu_k^{-\delta} & \text{otherwise} \end{cases}$$

Here, $u_{i,j,k}$ and $v_{i,j,l}$ are learning parameters that are learning targets, for example. Furthermore, $\lambda_k^{t1}$ and $\mu_l^{t2}$ are predefined parameters that change in a predetermined manner in accordance with a time point difference $\delta$ between the hidden nodes and input data in the input data sequence before the one time point and the hidden nodes and input data at the one time point ($t1=\delta-d_{ij}$, $t2=-\delta$). That is, the weight parameter $W_{ij}^{[\delta]}$ can be a parameter based on the learning parameters $u_{i,j,k}$ and $v_{i,j,l}$ and the predefined parameters $\lambda_k^{t1}$ and $\mu_l^{t2}$.

The weight parameter $W_{ij}^{[\delta]}$ can be a parameter based on a positive value, which is based on a product of the first learning parameter $u_{i,j,k}$ and the first predefined parameter $\lambda_k^{t1}$, and a negative value, which is based on a product of the second learning parameter $v_{i,j,l}$ and a second predefined parameter $\mu_l^{t2}$. Specifically, in the case where the time point difference $\delta$ is greater than or equal to a predetermined delay constant $d_{ij}$, the weight parameter $W_{ij}^{[\delta]}$ can be a positive value based on a product of the first learning parameter $u_{i,j,k}$ and the first predefined parameter $\lambda_k^{t1}$. In the case where the time point difference $\delta$ is less than the delay constant $d_{ij}$ and is not equal to 0, the weight parameter $W_{ij}^{[\delta]}$ can be a negative value based on a product of the second learning parameter $v_{i,j,l}$ and the second predefined parameter $\mu_l^{t2}$. In addition, in the case where the time point difference $\delta$ is equal to 0, the weight parameter $W_{ij}^{[\delta]}$ can be equal to 0.

In addition, in the case where the time point difference $\delta$ is greater than or equal to the predetermined delay constant $d_{ij}$, the weight parameter $W_{ij}^{[\delta]}$ can be based on a plurality of positive values that are based on the products $u_{i,j,k} \cdot \lambda_k^{t1}$ of a plurality of sets of the first learning parameter $u_{i,j,k}$ and the first predefined parameter $\lambda_k^{t1}$ respectively from among the plurality of first learning parameters $u_{i,j,k}$ and the plurality of first predefined parameters $\lambda_k^{t1}$. In addition, in the case where the time point difference $\delta$ is less than the predetermined delay constant $d_{ij}$ and is not equal to 0, the weight parameter $W_{ij}^{[\delta]}$ can be based on a plurality of negative values that are based on products $v_{i,j,l} \cdot \mu_l^{t2}$ of a plurality of sets of the second learning parameter $v_{i,j,l}$ and the second predefined parameter $\mu_l^{t2}$ respectively from among the plurality of second learning parameters $v_{i,j,l}$ and the plurality of second predefined parameters $\mu_l^{t2}$.

A predefined parameter can be a parameter based on a value obtained by raising a predetermined constant to the power of a value based on the time point difference $\delta$. The first predefined parameter $\lambda_k^{t1}$ is a parameter whose value gradually decreases as the time point difference $\delta$ increases, for example. In this case, the first predefined parameter $\lambda_k^{t1}$ can be a value obtained by raising a first constant $\lambda_k$, which is greater than 0 and less than 1, to the power of a value obtained by subtracting the predetermined delay constant $d_{ij}$ from the time point difference $\delta$ ($\delta - d_{ij} = t1$). In addition, the second predefined parameter $\mu_l^{t2}$ can be a parameter whose value gradually decreases as the time point difference $\delta$ increases, for example. In this case, the second predefined parameter $\mu_l^{t2}$ can be a value obtained by raising a second constant $\mu_l$, which is greater than 0 and less than 1, to the power of a negative value of the time point difference $\delta$ ($-\delta = t2$).

The above-described model 10 according to the present embodiment can be operable to form a Boltzmann machine. That is, the model 10 can be a Boltzmann machine to which time-series data is applied. The model 10 can be a Boltzmann machine that includes hidden layers into which are input values differing from the time-series data, in addition to the input layers into which the time-series data is input. The learning apparatus 100 according to the embodiment learns the model 10 by adjusting the learning parameters $u_{i,j,k}$ and $v_{i,j,l}$ and the bias parameter $b_j$ while sampling and storing the values of the hidden nodes, by using, as training data, input data at one time point that is supplied to the 0-th input layer of the model 10. A learning operation of the learning apparatus 100 is described with reference to FIG. 3.

Figure 3:
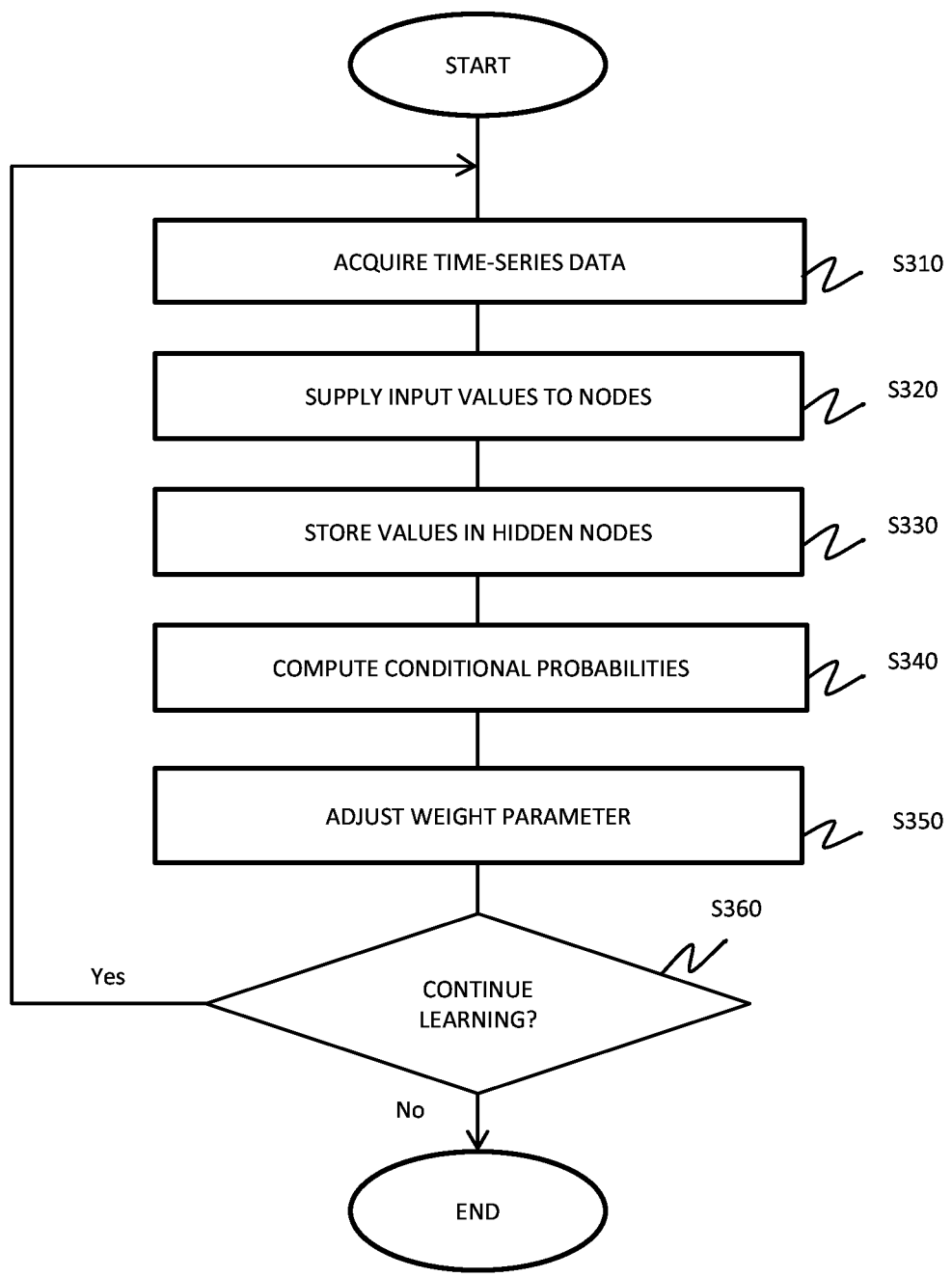
FIG. 3 shows a flow of an operation of the learning apparatus 100 according to an embodiment.

FIG. 3 shows a flow of an operation of the learning apparatus 100 according to the present embodiment. In the present embodiment, the learning apparatus 100 can be operable to learn the model 10 corresponding to time-series input data and determine the learning parameters $u_{i,j,k}$ and $v_{i,j,l}$ and the bias parameter $b_j$, by executing the processing steps of S310 to S360. In the present embodiment, first, an example is described in which the determination of the weight parameters to the hidden nodes and the weight parameters to the input nodes is performed by the learning apparatus 100 using substantially the same operation.

First, the acquiring section 110 can acquire time-series data (S310). The acquiring section 110 can acquire time-series data of a duration equivalent to a total of T layers from the 0-th layer to the (−T+1)-th layer of the model 10. The acquiring section 110 acquires, for example, T pieces of image data in time-series that form the moving image data.

Then, the supplying section 120 can supply a plurality of input values corresponding to the input data of the time-series input data at one time point to the plurality of input nodes of the 0-th input layer of the model 10 (S320). Here, $x_{[1,I]}^{[0]}$ (=$x_j^{[0]}$, $1 \leq j \leq I$) denotes input data supplied to the 0-th input layer.

The supplying section 120 supplies, for example, I input values $x_j^{[0]}$ corresponding to input data $x_{1,I}^{[0]}$ of the time-series input data at the most recent time point to the corresponding nodes j of the 0-th input layer ($1 \leq j \leq I$). For example, the supplying section 120 supplies I pieces of pixel data included in the last piece of image data of T pieces of image data arranged in time series to form the moving image data to I nodes of the 0-th input layer. The supplying section 120 can supply a value of 1 or 0 as the pixel data to each node of the 0-th input layer. If the duration of the time-series input data is shorter than T, the supplying section 120 can supply the data to a number of layers from the 0-th input layer corresponding to the length of the time series, and can supply a value of 0, for example, to the nodes of the rest of the layers.

Then, the supplying section 120 can supply a plurality of input values corresponding to the input data sequence before the one time point to the plurality of nodes included in respective layers from the −1st input layer to the (−T+1)-th input layer of the model 10. Here, let $x_j^{(-T,-1]}$ denote input data supplied to layers from the −1st input layer to the (−T+1)-th input layer ($1 \leq j \leq I$). The term (−T, −1] indicates layers from the (−T+1)-th layer to the −1st layer. That is, the input data $x_j^{(-T,-1]}$ in the time-series data denotes a history up to the input data $x_j^{[0]}$, for example.

Next, the storage section 130 samples the values of a plurality of hidden nodes corresponding to the one time point, and respectively stores these values in the corresponding plurality of hidden nodes of the 0-th hidden layer (S330). The storage section 130 can arbitrarily or randomly input values of 1 or 0. The storage section 130 stores H sampled values in the corresponding hidden nodes j of the 0-th hidden layer, for example ($I+1 \leq j \leq I+H$).

The storage section 130 can store the values of the hidden nodes before the one time point respectively in a plurality of nodes in each of the corresponding hidden layers from the −1st hidden layer to the (−T+1)-th hidden layer of the model 10. Here, let let $x_j^{(-T,-1]}$ denote the values of the hidden nodes stored in the layers from the −1st hidden layer to the (−T+1)-th hidden layer ($I+1 \leq j \leq I+H$). That is, the values $x_j^{(-T,-1]}$ input to the nodes of each common layer 12 before the one time point denote a history up to the input values $x_j^{[0]}$ input to the nodes of the 0-th common layer, for example ($1 \leq j \leq I+H$).

Then, the computing section 140 can compute conditional probabilities of each input value $x_j^{[0]}$ ($1 \leq j \leq I$) of an input node at the one time point, based on the input values $x_j^{(-T,-1]}$ ($1 \leq j \leq I+H$) of the plurality of nodes of the (−T+1)-th common layer to the −1st common layer and the weight parameter $W_{ij}^{[\delta]}$ (S340). The computing section 140 computes a probability $\langle x_j^{[0]} \rangle_\theta$ of the input value $x_j^{[0]}$ ($1 \leq j \leq I$) of the j-th node of the 0-th input layer being equal to 1 by substituting 1 for $x_j^{[0]}$ in the following expression, based on the history $x^{(-T,-1]}$ ($1 \leq j \leq I+H$) of the plurality of nodes of the common layer 12.

$$\langle X_j^{[0]} \rangle_\theta = \quad \text{Expression 2}$$
$$p_{\theta,j}(x_j^{[0]} \mid x^{(-T,-1]}) = \frac{\exp(-\tau^{-1} E_{\theta,j}(x_j^{[0]} \mid x^{(-T,-1]}))}{1 + \exp(-\tau^{-1} E_{\theta,j}(x_j^{[0]} \mid x^{(-T,-1]}))}$$

In the present embodiment, an example is described in which the input value $x_j^{[0]}$ of each node is binary, i.e. 1 or 0, but the value of the input value $x_j^{[0]}$ is not limited to these values. Furthermore, in the step for computing the conditional probabilities of each input value $x_j^{[0]}$ ($1 \leq j \leq I$) of the 0-th input layer, the computing section 140 can compute the conditional probabilities of the values $x_j^{[0]}$ ($I+1 \leq j \leq I 30$ H) of the 0-th hidden layer.

Expression 2 is derived as a Boltzmann machine from a known probability formula. For example, θ denotes a set of parameters to be computed, and the formula θ= ($b_j$, $u_{i,j,k}$, $v_{i,j,l}$) is established. In addition, τ can be a parameter that is dependent on a known "system temperature" of the Boltzmann machine, and can be preset by a user or the like. Also, $E_{\theta,j}(x_j^{[0]}|x^{(-T,-1]})$ of Expression 2 is computed by using the following expression.

$$E_{\theta,j}(x_j^{[0]} \mid x^{(-T,-1]}) = -b_j x_j^{[0]} - \sum_{t=-T}^{-1} (x^{[t]}) W_{:,j}^{[-t]} x_j^{[0]} \quad \text{Expression 3}$$

Here, "T" denotes a transpose, ":" denotes 1 to n in a case where n (=I+H) denotes the number of nodes, and ":,j" indicates extraction of the j-th column. That is, the second term on the right side of Expression 3 is denoted by the following expression, for example.

$$\sum_{t=-T}^{-1} (x^{[t]})^T W_{:,j}^{[-t]} x_j^{[0]} = (x_1^{[t]}, x_2^{[t]}, \ldots, x_n^{[t]}) \begin{pmatrix} W_{1,j}^{[-t]} \\ W_{2,j}^{[-t]} \\ \vdots \\ W_{n,j}^{[-t]} \end{pmatrix} x_j^{[0]}$$

$$= \sum_{i=1}^{N} \left( \sum_{k \in K} u_{i,j,k} \alpha_{i,j,k} - \sum_{l \in L} v_{i,j,l} \beta_{i,j,l} - \sum_{l \in L} v_{j,i,l} \gamma_{i,l} \right) x_j^{[0]} \quad \text{Expression 4}$$

Here, $\alpha_{i,j,k}$, $\beta_{i,j,l}$, and $\gamma_{i,l}$ are denoted by the following expressions.

$$\alpha_{i,j,k} \equiv \sum_{r=-T}^{-d_{ij}} \lambda_k^{t-d_{ij}} x_i^{[t]} \quad \text{Expression 5}$$

$$\beta_{i,j,k} \equiv \sum_{t=-d_{ij}+1}^{-1} \mu_l^t x_i^{[t]} \quad \text{Expression 6}$$

$$\gamma_{i,l} \equiv \sum_{t=-T}^{-1} \mu_l^{-t} x_i^{[t]} \quad \text{Expression 7}$$

Accordingly, $P_{\theta,j}(1|x_j^{(-T,-1]})$ obtained by substituting 1 for $x_j^{[0]}$ of Expression 2 can be computed from Expression 3 by substituting 1 for $x_j^{[0]}$ in expression 5. Note that predetermined initial values (for example, 0) can be substituted for the parameter set $\theta=(b_j, u_{i,j,k}, v_{i,j,l})$. In this way, the computing section 140 can compute a conditional probability $\langle x_j^{[0]} \rangle_\theta$ of each input value $x_j^{[0]}$ at the one time point which is denoted by Expression 2.

Then, the learning processing section 150 can adjust the parameter set $\theta=(b_j, u_{i,j,k}, v_{i,j,l})$ (S350). When adjusting the bias parameter $b_j$, the learning processing section 150 can determine a direction of the change in the bias parameter $b_j$ by using the following expression.

$$\frac{\partial}{\partial b_j} \log P_\theta(x_{[1,I]}^{[0]} \mid x^{(-T,-1]}) = \tau^{-1}(x_j^{[0]} - \langle X_j^{[0]} \rangle_\theta) \quad \text{Expression 8}$$

Here, $x_j^{[0]}$ on the right side of Expression 8 denotes an input value supplied as training data by the supplying section 120, and $\langle x_j^{[0]} \rangle_\theta$ on the right side denotes a probability computed by using Expression 2 ($1 \leq j \leq I$). The bias parameter $b_j$ for each input node ($1 \leq j \leq I$) can be adjusted and updated as denoted by the following expression by using Expression 8. Note that a coefficient c is a parameter predetermined by the user or the like.

$$b_j \leftarrow b_j + c\frac{1}{\tau}(x_j^{[0]} - \langle X_j^{[0]} \rangle_\theta) \quad \text{Expression 9}$$

That is, the learning processing section 150 adjusts the bias parameter $b_j$ so as to increase the conditional probability of the input value $x_j^{[0]}$ of the node of the 0-th input layer occurring, on a condition that the history $x^{(-T,-1]}$ of the common layer 12 has occurred. The learning processing section 150 can iteratively perform updating of the bias parameter $b_j$ denoted by Expression 9 and computing of the probability $\langle x_j^{[0]} \rangle_\theta$ denoted by Expression 2, to determine the bias parameter $b_j$. The learning processing section 150 stops updating the bias parameter $b_j$ and determines the bias parameter $b_j$ if a difference in the bias parameter $b_j$ before and after updating is less than or equal to a predetermined threshold. If a bias parameter $b_j$ is also set for a hidden node, the learning processing section 150 can determine the bias parameter $b_j$ of the hidden node in the same manner.

Alternatively, the learning processing section 150 can decide upon the bias parameter $b_j$ by iteratively updating the bias parameter $b_j$ a predetermined number of times. If a difference in the bias parameter $b_j$ before and after updating is greater than or equal to the predetermined threshold even after the bias parameter $b_j$ has been updated the predetermined number of times, the learning processing section 150 can stop updating the bias parameter $b_j$ and inform the user that the parameter does not converge.

Similarly, when updating the learning parameter $u_{i,j,k}$, the learning processing section 150 can determine the direction of a change in the learning parameter $u_{i,j,k}$ by using the following expression.

$$\frac{\partial}{\partial u_{i,j,k}} \log P_\theta(x_{[1,I]}^{[0]} \mid x^{(-T,-1]}) = \tau^{-1}\alpha_{i,j,k}(x_j^{[0]} - \langle X_j^{[0]} \rangle_\theta) \quad \text{Expression 10}$$

In addition, when updating the learning parameter $v_{i,j,l}$, the learning processing section 150 can determine the direction of a change in the learning parameter $v_{i,j,l}$ by using the following expression.

$$\frac{\partial}{\partial v_{i,j,l}} \log P_\theta(x_{[1,I]}^{[0]} \mid x^{(-T,-1]}) = \quad \text{Expression 11}$$
$$-\tau^{-1}\beta_{i,j,l}(x_j^{[0]} - \langle X_j^{[0]} \rangle_\theta) - \tau^{-1}\gamma_{j,l}(x_i^{[0]} - \langle X_i^{[0]} \rangle_\theta)$$

In the same manner as the updating of the bias parameter $b_j$, the learning processing section 150 can iteratively perform updating of the learning parameters $u_{i,j,k}$ and $v_{i,j,l}$ corresponding to the input nodes ($1 \leq j \leq I$) and computing of the probability $\langle x_j^{[0]} \rangle_\theta$ to determine the learning parameters $u_{i,j,k}$ and $v_{i,j,l}$ corresponding to the input nodes ($1 \leq j \leq I$). Alternatively, the learning processing section 150 can iteratively perform an operation for updating the parameter set $\theta=(b_j, u_{i,j,k}, v_{i,j,l})$ and then computing the probability $\langle x_j^{[0]} \rangle_\theta$ denoted by Expression 2 to determine the parameter set $\theta=(b_j, u_{i,j,k}, v_{i,j,l})$.

As described above, the learning processing section 150 according to the present embodiment can decide upon the learning parameters $u_{i,j,k}$ and $v_{i,j,l}$ and the bias parameter $b_j$ through learning. The learning apparatus 100 can then determine whether to continue learning (S360). The learning apparatus 100 can continue learning until it performs the learning process a predetermined number of times, or can continue learning until a stop command is input by the user. Alternatively, the learning apparatus 100 can continue learning until it can no longer acquire time-series data.

If the learning apparatus 100 continues learning (S360: YES), the process can return to step S310, in which the acquiring section 110 acquires the next time-series data, and the learning apparatus 100 can then perform learning of the model 10 based on the next time-series data. For example, the supplying section 120 supplies the 0-th input layer with the next image data in the image data acquired by the acquiring section 110. Furthermore, the storage section 130 samples the values of the hidden layers and stores these values in the 0-th hidden layer. Then, values held in the t-th common layer ($-T < t < 0$) can be supplied to the (t−1)-th common layer. The values held in the (−T+1)-th layer can be deleted. The learning apparatus 100 can perform learning by using image data supplied to the layers from the 0-th input layer to the (−T+1)-th input layer as training data and using the values stored in the layers from the 0-th hidden layer to the (−T+1)-th hidden layer.

In this way, the supplying section 120 and the storage section 130 can sequentially acquire new input values $x_j^{[0]}$ at the next time point corresponding to the nodes of the 0-th common layer in the model 10. Then, the computing section 140 can compute a conditional probability $\langle x_j^{[0]} \rangle_\theta$ of the new input value $x_j^{[0]}$ on a condition that the history has occurred for each common layer before the next time point. The learning processing section 150 can adjust the weight parameter so as to increase the conditional probability of the new input value occurring on the condition that this history has occurred.

If the learning processing section 150 stops learning (S360: NO), the learning processing section 150 can output the learning parameters $u_{i,j,k}$ and $v_{i,j,l}$ and the bias parameter $b_j$ that have been determined and store the parameters in the external database 1000 or the like.

As described above, the learning apparatus 100 according to the present embodiment can be operable to apply, to time-series input data that is input in time series, a model having a total of T layers by associating one time point with the 0-th common layer and an input data sequence before the one time point with T-1 layers. The learning apparatus 100 can be operable to apply a model having hidden nodes to each common layer 12. That is, the learning apparatus 100 can be operable to form a time-evolution Boltzmann machine that predicts input data at one time point on the basis of the input data sequence and hidden node values.

The learning apparatus 100 is able to learn the model by computing a conditional probability of the input value $x_j^{[0]}$ at the one time point occurring, based on the input value $x^{(-T, -1]}$, which is a history, for a model that takes time evolution into consideration. Furthermore, since the learning apparatus 100 learns the model using hidden nodes in addition to the time-series input data, the expressive ability and learning ability can be improved.

A description has been given of the learning apparatus 100 according to the present embodiment that sequentially acquires new input data from time-series input data and adjusts the weight parameter for each input data acquired. Instead of this configuration, the learning apparatus 100 can acquire time-series input data of a predetermined duration and then adjust the weight parameters. For example, the learning processing section 150 adjusts the weight parameters collectively for a plurality of time points in response to acquisition of new input data at a plurality of time points corresponding to D layers.

Figure 4:
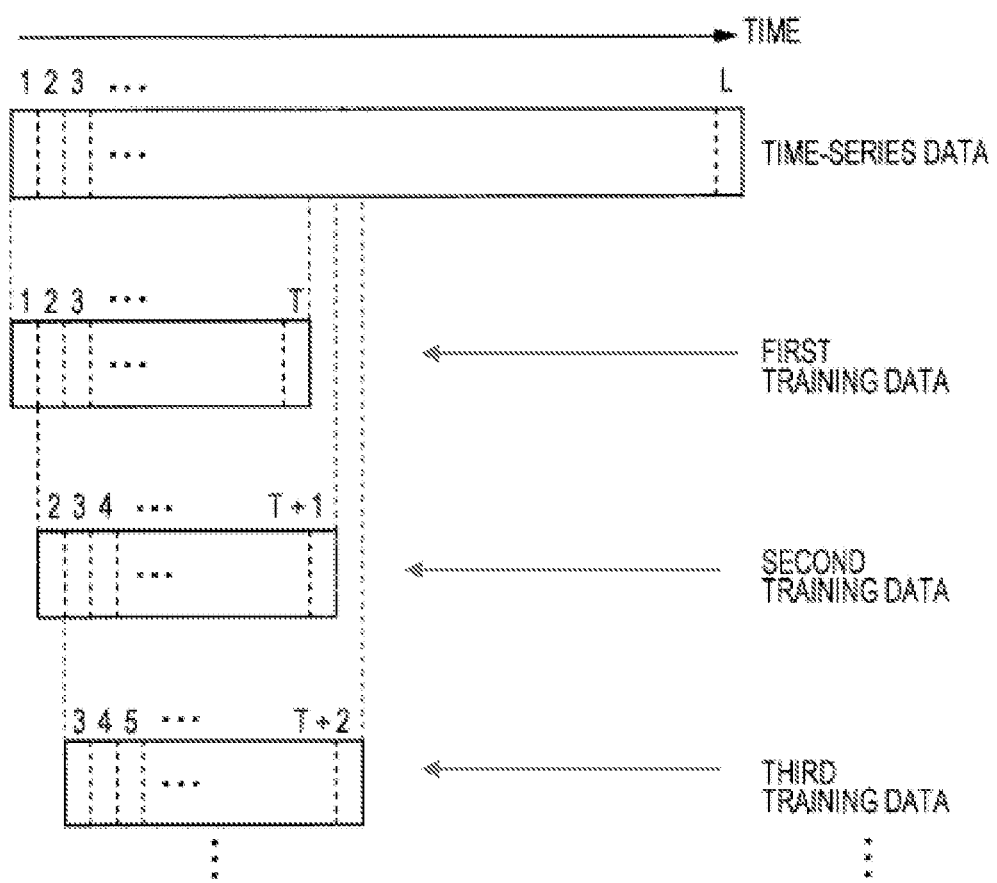
FIG. 4 shows an example of structures of time-series data and training data for use in learning in an embodiment.

FIG. 4 shows an example of structures of time-series data and training data for use in learning in the present embodiment. In FIG. 4, the horizontal axis denotes time. FIG. 4 shows an example in which the learning apparatus 100 uses time-series data $y^{[1, L]}$ having a duration L that is longer than a duration T of time-series data $y^{[1, T]}$ used as training data by the learning apparatus 100 during learning. In this case, the learning processing section 150 can be operable to adjust weight parameters for a plurality of time points all together, in response to input data at a plurality of time points being newly acquired.

The learning apparatus 100 first performs learning using, as first training data, a time-series data segment of the time-series data from a time 1 to a time T. In this case, as described in FIG. 3, the learning apparatus 100 can perform learning by setting the time-series data and corresponding hidden layer values from the time 1 to the time T as each input value of the common layer 12 at the one time point in order, and incrementally shifting the time points one at a time toward the future. The learning apparatus 100 can use data at a time T as each input value $x_j^{[0]}$ the one time point, and continue learning until the time-series data from the time 1 to a time T-1 becomes the input data sequence $x^{(-T, -1]}$ (i.e. the history).

Next, the learning apparatus 100 performs learning using, as second training data, a time-series data segment of the time-series data from a time 2 to a time T+1. The learning apparatus 100 can sequentially use each of D pieces of data in the second training data as the input value $x_j^{[0]}$ at the one time point. In this case, the learning apparatus 100 can shift the time point in the interval from the time 2 to the time T+1 one time point at a time toward the future and use, as the history, the corresponding time-series data and hidden nodes of the interval from the time 2 to the time T. In this way, the learning apparatus 100 can adjust the parameters D times for the D input values $x_j^{[0]}$ and the corresponding D histories. That is, the learning apparatus 100 can use a stochastic gradient technique in which the learning method described with Expressions 8 to 11 is performed.

Alternatively, the learning apparatus 100 can acquire D time-series data sets, generate a plurality of training data sets from time-sequence data segments of a duration of L, and collectively perform learning for D layers. Specifically, the learning apparatus 100 can perform the stochastic gradient technique described using Expressions 8 to 11 collectively for D layers, by using the following expression.

$$\theta \leftarrow \theta + \eta \sum_{x \in \{y^{(t, t+T-1]} | 0 \leq t < D\}} \nabla_\theta \log P_\theta(x_{[1, I]}^{[0]} | x^{(-T, -1]}) \quad \text{Expression 12}$$

Figure 5:
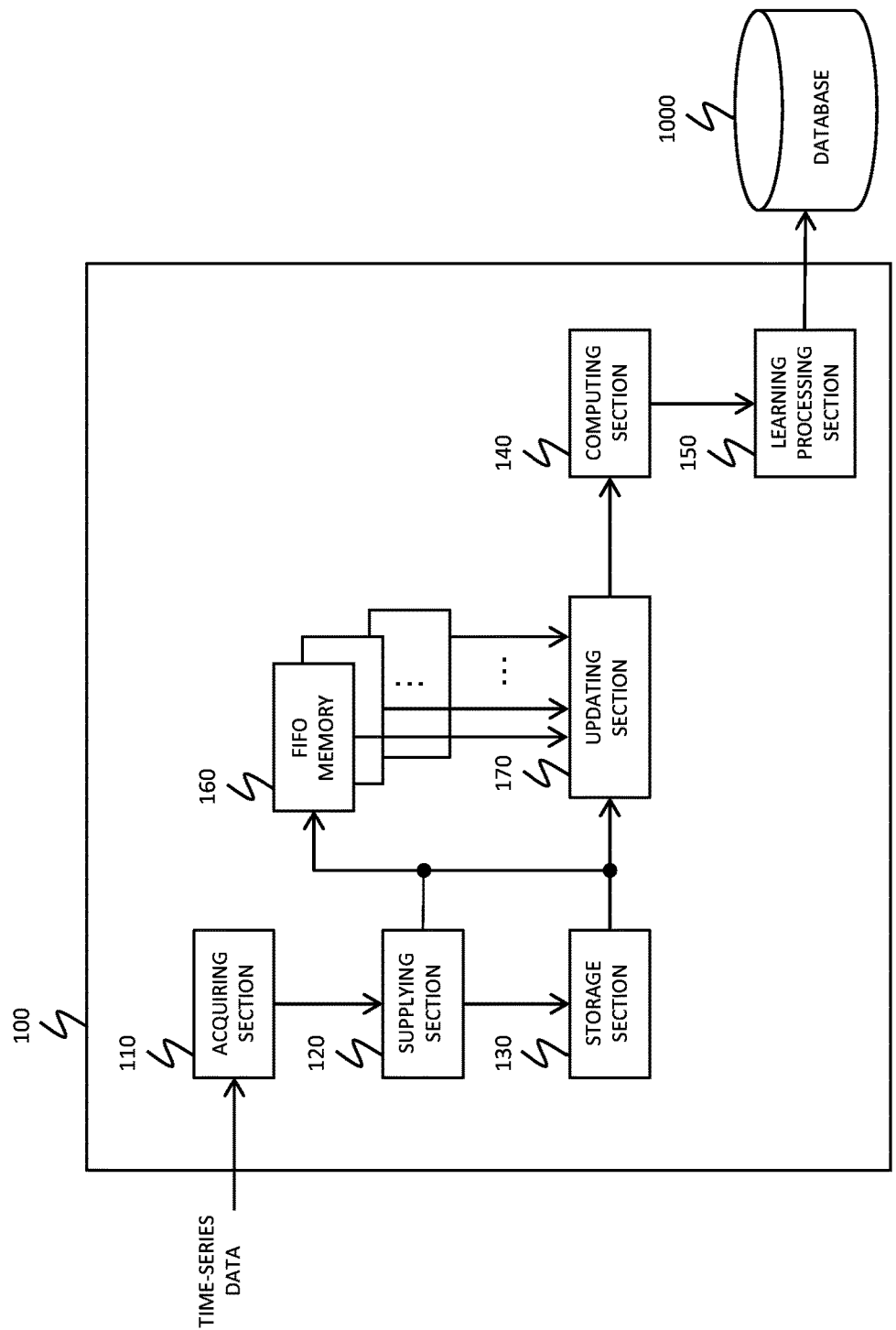
FIG. 5 shows a modification of the learning apparatus 100 according to an embodiment.

FIG. 5 shows a modification of the learning apparatus 100 according to the present embodiment. Components of the learning apparatus 100 shown in FIG. 5 that perform substantially the same operations as those of the learning apparatus 100 according to the embodiment illustrated in FIG. 1 are denoted by the same reference numerals, and a description thereof is omitted. In a case where time-series data of a duration L such as described in FIG. 4 is provided, the learning apparatus 100 according to the present modification can be operable to efficiently update parameters by using FIFO memories and learn a model corresponding to the time-series input data. The learning apparatus 100 according to the present modification further includes FIFO memories 160 and an updating section 170.

Each of the FIFO memories 160 can sequentially store input data and output the stored data after a predetermined number of storages have been performed. Each of the FIFO memories 160 can be a memory that first outputs data that has been stored first (FIFO: First In, First Out).

Each of the FIFO memories 160 can sequentially store an input value of the common layer 12 and output the input value after a predetermined number of storages have been performed. The learning apparatus 100 can include a plurality of FIFO memories 160, the number of which is greater than or equal to the number of nodes n of the model. The plurality of FIFO memories 160 is desirably provided to have a one-to-one correspondence with the plurality of nodes of the common layer 12. That is, each of the plurality of FIFO memories 160 can be provided in a manner to store a history for a respective node of the common layer 12 or to update the history thereof.

The plurality of FIFO memories 160 are connected to the acquiring section 110 and the storage section 130, and sequentially store input values corresponding to new input data of the common layer 12. The plurality of FIFO memories 160 are also connected to the updating section 170 and sequentially supply the data stored therein to the updating section 170.

The updating section 170 can be operable to update a plurality of update parameters that are based on the hidden nodes and the input data sequence of the time-series input data before the one time point, from values at a prior time point to values at the one time point, on the basis of values of the update parameters and values of the hidden nodes and input values corresponding to the input data to be reflected next. The updating section 170 can update the update parameters by using values input to the FIFO memories 160 and values output from the FIFO memories 160. The updating section 170 can be connected to the acquiring section 110 and the storage section 130, and can receive values input to the FIFO memories 160. Alternatively, the updating section 170 can receive values input to the FIFO memories 160 from the acquiring section 110 via the supplying section 120.

Here, the update parameters are $\alpha_{i, j, k}$ and $\gamma_{i, l}$ shown in Expressions 5 and 7. In this case, the update parameters are based on input values i ($1 \leq i \leq I$) corresponding to input data of the input data sequence at each time point and the predefined parameters $\lambda_k^{t1}$ and $\mu_l^{t2}$ of the weight parameter $W_{ij}^{[\delta]}$ between this input value i and the target input node j ($1 \leq j \leq I$) or hidden node j ($I+1 \leq j < I+H$), for example. As another example, the update parameters are based on the hidden node i ($I+1 \leq i \leq I+H$) at each time point and the predefined parameters $\lambda_k^{t1}$ and $\mu_l^{t2}$ of the weight parameter $W_{ij}^{[\delta]}$ between this hidden node i and the target input node j ($1 \leq j \leq I$) or hidden node j ($I+1 \leq j \leq I+H$), for example.

The update parameters can be updated every time the acquisition of the time-series input data by the acquiring section 110 and the storage of the sampling values by the storage section 130 are performed sequentially. The above-described learning apparatus 100 according to the present modification can be operable to learn a modification of the model 10. The modification of the model 10 is described with reference to FIG. 6.

Figure 6:
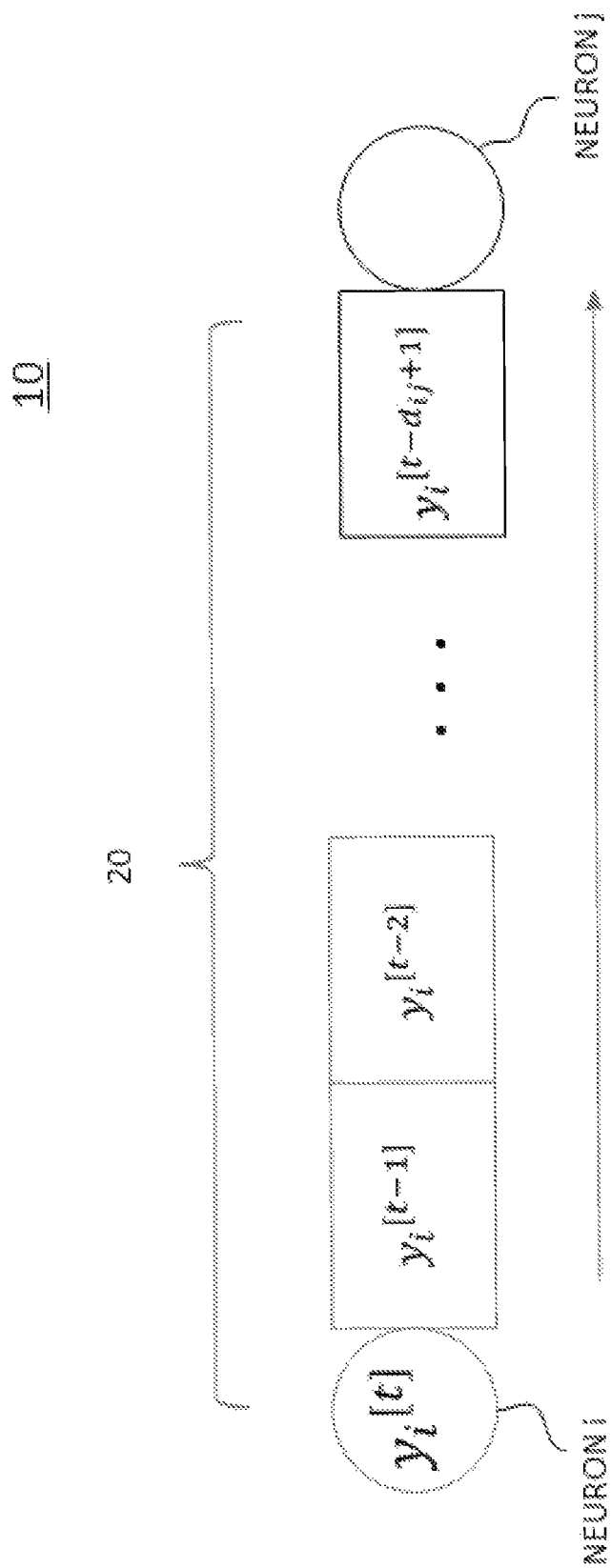
FIG. 6 shows a modification of the model 10 according to an embodiment.

FIG. 6 shows a modification of the model 10 according to the present embodiment. The model 10 according to the modification needs not have the layered structure including T layers shown in FIG. 2. FIG. 6 shows an example of a model corresponding to one of the FIFO memories 160. Accordingly, the overall configuration of the model 10 according to the present modification includes a storage area that is equivalent to the 0-th common layer in FIG. 2 including the training data, and a number of the configurations illustrated in FIG. 6 equal to the number of nodes n (=I+H). Neurons i and j and a FIFO sequence 20 of the model 10 according to the present modification are described below.

The neuron i can be equivalent to the input terminal of the FIFO memory 160. An input value $y_i^{[t]}$ ($1 \leq i \leq I$) of each node in the input data of the input data sequence at each time point t and a corresponding value $y_i^{[t]}$ among the values $y_i^{[t]}$ ($I+1 \leq i \leq I+H$) of the hidden nodes at each time point are sequentially input to the neuron i. The neuron i can set the value $y_i^{[t]}$ input thereto as the current input value. Then, at a time point t+1, the neuron i can supply the input value $y_i^{[0]}$ input at the time point t to the updating section 170 and to the FIFO sequence 20 as the previous input value and can hold the input value $y_i^{[t+1]}$ at the time point t+1 as the current input value.

The FIFO sequence 20 can store $d_{ij}-1$ of the latest input values received from the neuron i. The FIFO sequence 20 can supply the $d_{ij}-1$ input values stored therein to the updating section 170. The updating section 170 can be operable to compute the values of the update parameters denoted by Expression 6 by using the input values supplied by the FIFO sequence. If the FIFO sequence 20 holds input values from the time point t−1 to the time point $t-d_{ij}+1$, the FIFO sequence 20 is denoted by the following expression.

$$q_{i,j} = (y_i^{[t-1]}, y_i^{[t-d_{ij}+2]}, y_i^{[t-d_{ij}+1]})$$ Expression 13:

After the input value $y_i^{[t1]}$ is input to the neuron i at the time point t1, the FIFO sequence 20 can store the input value $y_i^{[t1]}$ up until a time point t3 (=$t1+d_{ij}-1$) which is a predetermined time period $d_{ij}-1$ after the next time point t2 (=t1+1) of the time point t1. At the next time point t4 (=t3+1=$t1+d_{ij}$), the FIFO sequence 20 can supply the input value $y_i^{[t1]}$ to the neuron j. The input value $y_i^{[t1]}$ supplied to the neuron j at the time point t4 is immediately supplied to the updating section 170 at the time point t4. However, the input value $y_i^{[t1]}$ that the neuron j has received from the FIFO sequence 20 at the time point t4 does not serve as an input for the neuron j, and the input value $y_i^{[t4]}$ can be input to the neuron j at the time point t4.

The neuron j can be equivalent to the output terminal of the FIFO memory 160, and the neuron j can receive the input value $y_i^{[t1]}$ input to the neuron i at the time point t1, via the FIFO sequence after the time period $d_{ij}$, i.e. at the time point $t1+d_{ij}$. That is, the model 10 from the neuron i to the neuron j via the FIFO sequence 20 can correspond to the FIFO memory 160 that stores $d_{ij}$ pieces of input data. In addition, the neuron i of the model 10 according to the modification can correspond to, for example, a node for an input data sequence such as a node i of the (−δ)-th common layer of the model 10 shown in FIG. 2, and in this case the neuron j can correspond to, for example, the node j of the 0-th common layer. At the time point $t1+d1_{ij}$, the neuron j can supply the received input value $y_i^{[t1]}$ to the updating section 170.

As described above, the model 10 according to the present modification can supply the input values at the time point t−1 and the time point $t-d_{ij}+1$ to the updating section 170 at the time point t. In this way, the updating section 170 can update the update parameters by adding the corresponding input value in the input data to be reflected next to the update parameters for the time point before the one time point, and then multiplying the resulting sum by a predetermined constant. Note that the update parameters denoted by Expression 8 can be computed in accordance with Expression 8 by using the input values stored in the FIFO sequence 20 that are supplied to the updating section 170.

Figure 7:
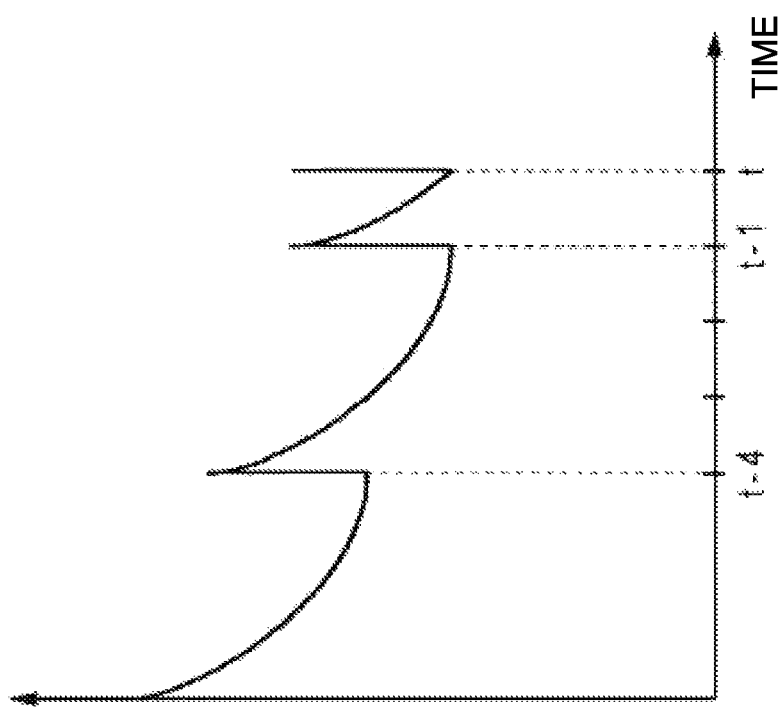
FIG. 7 shows an example of a temporal change in the update parameter $\gamma_{i,l}$ according to an embodiment.

For example, the update parameter $\gamma_{i,l}$ denoted by Expression 7 can be updated by using the input values supplied to the updating section 170 and the second predefined parameter. Specifically, the updating section 170 can compute the update parameter $\gamma_{i,l}$ to be used in the current learning by performing computing at the time point t according to the following expression by using the prior update parameter $\gamma_{i,l}$ and the input value $y_i^{[t-1]}$ received from the neuron i at the time point t.

$$\gamma_{i,l} \leftarrow \mu_l(\gamma_{i,l} + y_i^{[t-1]})$$ Expression 14:

FIG. 7 shows an example of a temporal change in the update parameter $\gamma_{i,l}$ according to the present embodiment. FIG. 7 shows an example in which values greater than 0 (for example, 1) are input to the neuron i as the input value at time points t-5, t-2, and t-1, and these input values are supplied to the updating section 170 at time points t-4, t-1, and t. The second predefined parameter $\mu_l$ is a parameter whose value gradually decreases as the time point difference increases. Accordingly, the update parameter $\gamma_{i,l}$ computed by the updating section 170 tends to decrease as time passes from when the input value of 1 is input to when the next input is given.

Figure 8:
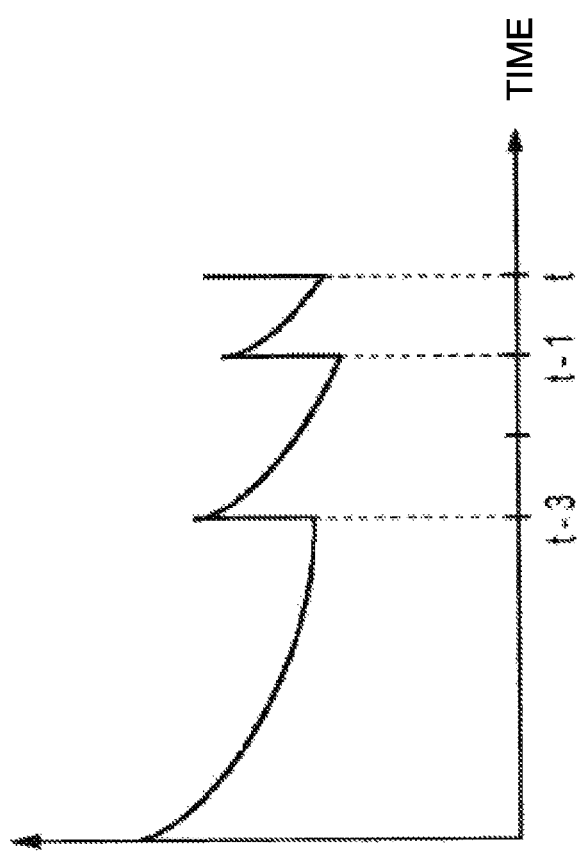
FIG. 8 shows an example of a temporal change in the update parameter $\alpha_{i,j,k}$ according to an embodiment.

The update parameter $\alpha_{i,j,k}$ denoted by Expression 5 can be updated by using the input values supplied to the updating section 170 and the first predefined parameter $\lambda_k$. Specifically, the updating section 170 can compute the update parameter $\alpha_{i,j,k}$ to be used in the current learning by performing computing at the time point t according to the following expression, by using the prior update parameter $\alpha_{i,j,k}$ and the input value $y_i^{[t-d_{ij}]}$ received from the neuron j at the time point t.

$$\alpha_{i,j,k} \leftarrow \lambda_k(\alpha_{i,j,k} + \gamma_i^{[t-d_{ij}]})$$ Expression 15:

FIG. 8 shows an example of a temporal change in the update parameter $\alpha_{i,j,k}$ according to the present embodiment. FIG. 8 shows an example in which values greater than 0 (for example, 1) are supplied to the neuron j as the input value at time points t-3, t-1, and t. The first predefined parameter $\lambda_k$ is a parameter whose value gradually decreases as the time point difference increases. Accordingly, the update parameter $\alpha_{i,j,k}$ computed by the updating section 170 tends to decrease as time passes from when the input value of 1 is input to when the next input is given.

As described above, the learning apparatus 100 according to the present modification can update the update parameters $\alpha_{i,j,k}$ and $\gamma_{i,l}$ by applying the model 10 shown in FIG. 6 using the FIFO memories 160 and the updating section 170. Note that the updating section 170 can apply the model 10 according to the present modification, for example, by acquiring the input values $x_i^{[t-1]}$ at the time point t-1 from the input data input to the FIFO memories 160 and acquiring the input values $x_i^{[t-dij]}$ at the time point t-$d_{ij}$ from the output of the FIFO memories 160.

In addition, the learning apparatus 100 can update the parameter $\beta_{i,j,l}$ through substantially the same operation as the operation described in FIG. 3. Specifically, the computing section 140 can compute the parameter $\beta_{i,j,l}$ by determining the sum of products of the second predefined parameter $\mu_l$ and the input value $x_i$ ($y_i$ in the present modification) for time points from t-1 to t-$d_{ij}$+1 as indicated by Expression 6.

In this way, the computing section 140 according to the present modification can compute, by using the plurality of update parameters, conditional probabilities of input data values at one time point on the condition that the hidden node values and input data sequence have occurred. Then, the learning processing section 150 can determine the learning parameters $u_{i,j,k}$ and $v_{i,j,l}$ and the bias parameter $b_j$ by performing substantially the same operation as the operation described in FIG. 3.

In other words, the learning apparatus 100 according to the present embodiment can determine the weight parameter and bias parameters in a manner to increase the probability of predicting the input value to be input to the input layer 14 of the common layer 12, based on the past values that have been input to the common layer 12 of the model 10 before the one time point. Furthermore, the learning apparatus 100 can improve the prediction accuracy, the expressive ability, the learning efficiency, and the like of the input values input to the input layer 14 by having the common layer 12 include the hidden layer 16 in addition to the input layer 14.

The learning apparatus 100 according to the present embodiment described above is an example in which a value that is unrelated to the prediction made by the learning apparatus 100 is sampled and input as the hidden node value to be input to the hidden layer 16. Instead of this, the learning apparatus 100 can determine the hidden node value by using a history of the conditional probability of the values of the nodes of the common layer 12. The learning apparatus 100 can determine the weight parameter to a hidden node by using this conditional probability history. The learning apparatus 100 can improve the prediction accuracy by using the conditional probability history of nodes of the common layer 12 to determine the weight parameter to the hidden node and the hidden node value.

In this case, the computing section 140 can compute the conditional probability $p_{j,t}$ of the value of a node j of the common layer 12 at one time point t based on the values input to the corresponding node j of the common layer 12 at each time point before the one time point t, and store this conditional probability in the storage section or the like. In addition to the computation of the conditional probability of each input value of the input layer 14 at the one time point described above, the computing section 140 can compute the conditional probability of each hidden node in the layer 16 at the one time point in the same manner. That is, the computing section 140 can use the plurality of update parameters to compute the conditional probability of the value of each hidden node and each input data value at the one time point on the condition that an input data sequence has occurred. Here, the computing section 140 can store the conditional probability $p_{j,t}$ in a FIFO or the like.

The computing section 140 can be operable to compute a total likelihood, after the learning by the learning apparatus 100 has continued. The computing section 140 computes the total likelihood $p_j$ as shown in the following expression, based on the conditional probabilities $p_{m,t-K-1}$, $p_{j,t-K+2}$, ..., $p_{j,t}$ computed by K instances of learning from the time point t-K+1 to the time point t, for example. The total likelihood $p_j$ in Expression 16 indicates a total sum of the conditional probabilities, as an example, but the total likelihood $p_j$ can be at least one of a sum, weighted sum, product, or weighted product of the conditional probabilities. Furthermore, K can be an integer greater than or equal to 2, and if the computing section 140 stores the conditional probabilities $p_{j,t}$ in a FIFO or the like, the length of the FIFO sequence can be equal to the value of K.

$$p = \sum_{s=t-k+1}^{t} p_s \quad \text{Expression 16}$$

The computing section 140 can supply the total likelihood $p_j$ to the storage section 130. The storage section 130 can sample the values $x_j^{[t]}$ of the hidden nodes of the hidden layer 16 at the one time point, based on the most recent likelihood $p_{j,t}$. That is, the storage section 130 according to the present embodiment can be operable to sample the value of each hidden node at the one time point, by using the conditional probability of the value of each hidden node at the one time point. For example, the storage section 130 samples the values of the hidden nodes based on the history of the conditional probabilities computed by the computing section 140. That is, the storage section 130 can sample the values of the hidden nodes after the learning operation of the learning processing section 150 has been performed a plurality of times. The storage section 130 can store a value of 0 in the hidden nodes as the sampling value, until the learning operation of the learning processing section 150 has been performed a plurality of times.

The storage section 130 can store a value of 1 or 0 in the hidden node j as the sampling result, according to the result of a comparison between the value of the total likelihood $p_j$ and a threshold value. In this way, when predicting the time series data to be input to the input layer 14, the storage section 130 can store a more preferable value as the hidden node value by performing sampling based on the history of past conditional probabilities.

The learning processing section 150 can be operable to determine the weight parameter based on the total likelihood $p_j$. In this case, the learning processing section 150 can compute update amounts $\Delta u_{i,j,k}$ and $\Delta v_{i,j,k}$ for the learning parameters $u_{i,j,k}$ and $v_{i,j,k}$ in the weight parameter for one hidden node j at the one time point. For example, the learning processing section 150 can compute these update amounts $\Delta u_{i,j,k}^{[t]}$ and $\Delta v_{i,j,k}^{[t]}$ as shown in the following expression, based on the value $x_j^{[t]}$ of the one hidden node j at the one time point t and on the conditional probability $\langle X_j^{[t]} \rangle$ of the value of this hidden node j at the one time point t on the condition that the input data sequence has occurred (I+1≤j≤I+H).

$$\Delta u_{i,j,k}^{[t]} = \alpha_{i,j,k}^{[t-1]}(x_j^{[t]} - \langle X_j^{[t]} \rangle)$$

$$\Delta v_{i,j,l}^{(1)[t]} = \beta_{i,j,l}^{[t-1]}(\langle X_j^{[t]} \rangle - x_j^{[t]})$$

$$\Delta v_{i,j,l}^{(2)[t]} = \gamma_{i,j,l}^{[t-1]}(\langle X_i^{[t]} \rangle - x_i^{[t]}) \quad \text{Expression 17:}$$

Here, the update amount $\Delta v_{i,\,j,\,k}{}^{[t]}$ is equal to $\Delta u_{i,\,j,\,k}{}^{(1)[t]} + \Delta u_{i,\,j,\,k}{}^{(2)[t]}$. The conditional probability $\langle X_j{}^{[t]}\rangle$ of the value of the hidden node j can be computed by the computing section 140 using Expression 2. The learning processing section 150 can store the computed update amounts $\Delta v_{i,\,j,\,k}{}^{[t]}$, $\Delta u_{i,\,j,\,k}{}^{(1)[t]}$, and $\Delta u_{i,\,j,\,k}{}^{(2)[t]}$ in the storage section or the like. The learning processing section 150 can be operable to store the update amounts $\Delta v_{i,\,j,\,k}{}^{[t]}$, $\Delta u_{i,\,j,\,k}{}^{(1)[t]}$, and $\Delta u_{i,\,j,\,k}{}^{(2)[t]}$ computed for one time point in the FIFO sequence. That is, the learning processing section 150 can be operable to update the learning parameters based on update amounts computed in the past.

The learning processing section 150 changes the ratio by which the update amounts are reflected in the learning parameters, according to the conditional probability of input data occurring at a following time point that is after the one time point t, for example. In this case, the learning processing section 150 can change the ratio by which the update amounts are reflected in the learning parameters according to the conditional probability of a hidden node value occurring at a plurality of following time points that are after the one time point. In the present embodiment, an example is described in which the learning processing section 150 changes the ratio by which the update amounts are reflected in the learning parameters according to the total likelihood $p_j$ after the one time point.

The learning processing section 150 can update the learning parameters as shown in the following expression, based on the total likelihood $p_j$ computed by K instances of learning from the time point t−K+1 to the time point t and on the update amount at the time point t−K+1, for example. Here, K can be an integer greater than or equal to 2, and if the learning processing section 150 stores the update amounts in the FIFO sequence, the length of the FIFO sequence can be equal to the value of K.

$$u_{ij} \leftarrow u_{ij} + \eta_1 p_j \Delta u_{i,j,k}{}^{[t-k+1]}$$

$$v_{ij} \leftarrow v_{ij} + \eta_1 p_j (\Delta v_{i,j,k}{}^{(1)[t-k+1]} + \Delta v_{i,j,k}{}^{(2)[t-k+1]}) \qquad \text{Expression 18:}$$

Here, $\eta_1$ can be a constant for adjusting the update amount. Alternatively, $\eta_1$ can be a coefficient whose value becomes smaller according to an increase in the number of updates. Yet further, $\eta_1$ can have a value of substantially 1 at the stage when the learning processing section 150 begins learning, and can be a coefficient whose value becomes smaller according to the amount of learning occurring as time progresses from the time point t. For example, $\eta_1 = \eta_{10}/t^2$. Furthermore, $\eta_1$ can be a coefficient whose value becomes smaller according to the update amount. For example, $\eta_1 = \eta_{10}/(\Sigma \Delta u_{i,\,j,\,k}{}^2)^{1/2}$. Here, $\eta_{10}$ can be a predetermined constant.

In the manner described above, the learning processing section 150 can update the learning parameters of a hidden node at one time point according to the conditional probabilities computed at time points before the one time point. In this way, the learning apparatus 100 can more strongly reflect the update amounts at time points before the one time in the learning parameters, in response to the predicted probability of an input value of an input node being large due to the weight parameters at time points before the one time point. That is, the learning apparatus 100 can update the weight parameters of the hidden nodes in a manner to increase the conditional probabilities.

If a FIFO sequence is used to perform an update of such a weight parameter, the learning processing section 150 can extract from the FIFO sequence the update amounts $\Delta v_{i,\,j,\,k}{}^{[t-K+1]}$, $\Delta u_{i,\,j,\,k}{}^{(1)[t-K+1]}$, and $\Delta u_{i,\,j,\,k}{}^{(2)[t-K+1]}$ of a past time point (e.g. t−K+1) at the following time point (e.g. t) or a time point thereafter. The learning processing section 150 can update the ratio by which the update extracted from the FIFO sequence are reflected in the learning parameters according to the conditional probabilities of hidden node values occurring at the following time point t. For example, the learning processing section 150 can multiply the total likelihood $p_j$ respectively by each update amount. In this way, the learning processing section 150 can efficiently perform the update of the weight parameters as described above.

The learning apparatus 100 according to the present embodiment described above is an example in which a first predefined parameter $\lambda_k$ and a second predefined parameter $\mu_l$ are parameters based on values obtained by raising predetermined coefficients to powers according to a time point difference $\delta$. In this way, if the predefined parameters are used as parameters attenuated with a predetermined expression, attenuation rate, or the like, the learning time required for the learning apparatus 100 fluctuates significantly according to the initial values of the predefined parameters, and this requires that suitable initial values be set. Therefore, by updating the predefined parameters, the learning apparatus 100 can reduce the fluctuation in the learning time for the initial values of the predefined parameters. Such a learning apparatus 100 is described in the following.

The learning apparatus 100 can be operable to update predefined parameters using the updating section 170. Specifically, the updating section 170 can be operable to update the first predefined parameter $\lambda_k$ and/or the second predefined parameter $\mu_l$, in addition to updating a plurality of parameters including $\alpha_{i,\,j,\,k}$, $\beta_{i,\,j,\,l}$ and $\gamma_{i,\,l}$. First, an example is described in which the updating section 170 updates the first predefined parameter $\lambda_k$.

The updating section 170 can be operable to update the first predefined parameter $\lambda_k$ using a first update parameter $\alpha'_{i,\,j,\,k}$ that is based on the update parameter $\alpha_{i,\,j,\,k}$. The updating section 170 can be operable to update the first update parameter $\alpha'_{i,\,j,\,k}{}^{[t]}$ at one time point t, based on the update parameter $\alpha_{i,\,j,\,k}{}^{[t-1]}$ and the first update parameter $\alpha'_{i,\,j,\,k}{}^{[t-1]}$ at a previous time point t−1. The updating section 170 can be operable to perform the update of the first update parameter $\alpha'_{i,\,j,\,k}$ to be the first update parameter $\alpha'_{i,\,j,\,k}{}^{[t]}$ at the one time point, based on a value obtained by calculating the product of the first update parameter $\alpha'_{i,\,j,\,k}{}^{[t-1]}$ at the previous time point t−1 and the first predefined parameter $\lambda_k$ and adding the update parameter $\alpha_{i,\,j,\,k}{}^{[t-1]}$ at the previous time point t−1 to the product.

The updating section 170 updates the first update parameter $\alpha'_{i,\,j,\,k}$ using the following expression, for example.

$$\alpha'_{i,j,k}{}^{[t]} = \lambda_k \alpha'_{i,j,k}{}^{[t-1]} + \alpha_{i,j,k}{}^{[t-1]} \qquad \text{Expression 19:}$$

The updating section 170 can calculate the first update parameter $\alpha'_{i,\,j,\,k}{}^{[t-1]}$ at the previous time point t−1 as shown in the following expression, based on the update parameter $\alpha_{i,\,j,\,k}{}^{[t-1]}$ at the previous time point t−1. Here, s=t−$\delta$ and d=$d_{ij}$.

$$\alpha'^{[t-1]}_{i,j,k} = \frac{\partial}{\partial \lambda} \alpha^{[t-1]}_{i,j,k} = \qquad \text{Expression 20}$$

$$\sum_{\delta} (\delta - d) \lambda_k^{\delta-d-1} x_i^{[t-\delta]} = \sum_{s=-\infty}^{t-d-1} (t - s - d) \lambda_k^{t-s-d-1} x_i^{[s]}$$

The updating section 170 can be operable to update the first predefined parameter $\lambda_k$ as shown by the following expression, using the updated first update parameter $\alpha'^{[t]}_{i,j,k}$ and the error of the input value. The input value of the neuron j at the time point t is $x_j^{[t]}$, and the conditional probability of this input value $x_j^{[t]}$ is $\langle X_j^{[t]} \rangle$. Furthermore, the error of the input value is calculated to be the difference $x_j^{[t]} - \langle X_j^{[t]} \rangle$ between the input value $x_j^{[t]}$ of the neuron j and the conditional probability $\langle X_j^{[t]} \rangle$ of this input value. The updating section 170 can be operable to update the first predefined parameter $\lambda_k$ further based on the learning parameter $u_{i,j,k}$, as shown in the following expression.

$$\lambda_k \leftarrow \lambda_k + \eta_2 \sum_{i,j} u_{i,j,k} \alpha'^{[t-1]}_{i,j,k} (x_j^{[t]} - \langle X_j^{[t]} \rangle) = \lambda_k + \eta_2 \Delta \lambda_k \quad \text{Expression 21}$$

Here, $\eta_2$ can be a constant for adjusting the update amount. Instead, $\eta_2$ may be a coefficient whose value becomes smaller according to an increase in the number of updates. As another example, $\eta_2$ can be a coefficient with a value of approximately 1 at a stage when the updating section 170 begins learning and a value that becomes smaller according to further learning as time progresses from the time point t. For example, $\eta_2 = \eta_{20}/t^2$. As another example, $\eta_2$ can be a coefficient whose value becomes smaller according to the update amount. For example, $\eta_2 = \eta_{20}/(\Sigma \Delta \lambda_k^2)^{1/2}$. Here, $\eta_{20}$ can be a predetermined constant. In this way, the updating section 170 can be operable to calculate the update amount of the first predefined parameter $\lambda_k$ based on a learning rate for the update of the first predefined parameter $\lambda_k$.

The updating section 170 need not perform the update of the first predefined parameter $\lambda_k$ at each time point. The updating section 170 can update the first predefined parameter $\lambda_k$ in according to passage of time points, or can instead update the first predefined parameter $\lambda_k$ according to a predetermined probability. When updating the first predefined parameter $\lambda_k$, the updating section 170 can determine whether to update the first predefined parameter $\lambda_k$ based on a random number.

If the learning apparatus 100 includes a plurality of FIFO sequences 20, the learning apparatus 100 can set a common first predefined parameter $\lambda_k$ for a combination of a neuron i and a neuron j. In other words, the first predefined parameter $\lambda_k$ can be shared by the sets formed respectively by one of the plurality of neurons i and one of the plurality of neurons j, and can be updated for each set of a neuron i and a neuron j. In this case, the updating section 170 can be operable to, when updating the first predefined parameter $\lambda_k$, update the first predefined parameter $\lambda_k$ using the first update parameter of each set of a neuron i and a neuron j and the input value error of each neuron j.

In the manner described above, the learning apparatus 100 according to the present embodiment can determine the weight parameter and the bias parameter while updating the first predefined parameter $\lambda_k$. The learning operation of such a learning apparatus 100 is descried in the following.

Figure 9:
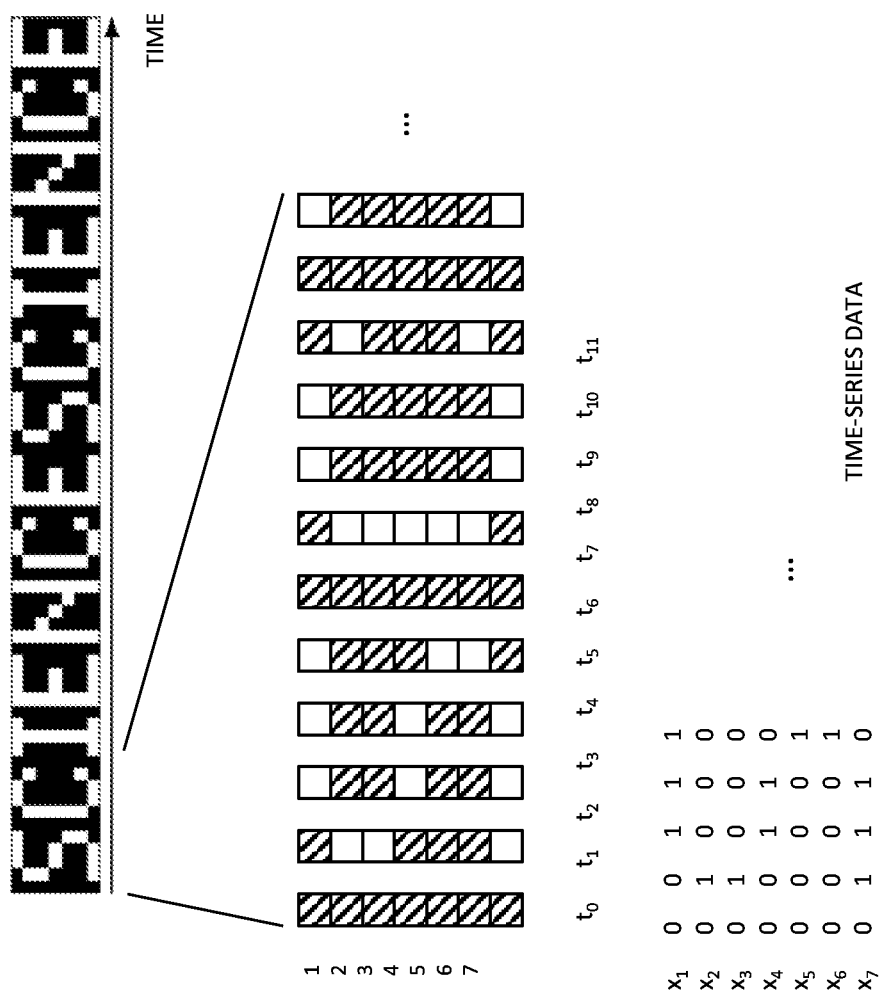
FIG. 9 shows an example of time-series data learned by the learning apparatus 100 according to an embodiment.

FIG. 9 shows an example of time-series data learned by the learning apparatus 100 according to the present embodiment. FIG. 9 shows an example of pattern data in which the letters "SCIENCE" are repeated two times. The pattern data indicating "SCIENCE" is a monochrome bitmap image that is 7 bits vertically by 35 bits horizontally, for example. The 7 bits of data in the vertical direction of the pattern data is the input data at a given time point for the learning apparatus 100. For example, a plurality of 7-bit data groups that are adjacent in the horizontal direction are each a piece of time-series input data that is input to the learning apparatus 100 at respective time points.

For example, the 7-bit image data at the time point to is "black" for all of the pieces of data from the first piece to the seventh piece, and therefore all of the data values can be the same one data value for the input data $x_j^{[0]}$ of the learning apparatus 100 ($1 \leq j \leq 7$). In other words, $x_j^{[0]} = (0, 0, 0, 0, 0, 0, 0)$. The 7-bit image data at the time point ti is the first piece of 7-bit image data in the letter "S" in which the second, third, and seventh pieces of data are "white," and therefore data values differing from the one data value can be set for the data corresponding to the input data $x_j^{[1]}$ of the learning apparatus 100. In other words, $x_j^{[1]} = (0, 1, 1, 0, 0, 0, 1)$. Similarly, based on the image data at each time point, the respective sets of time-series data can be $x_j^{[2]} = (1, 0, 0, 1, 0, 0, 1)$, $x_j^{[3]} = (1, 0, 0, 1, 0, 0, 1)$, $x_j^{[4]} = (1, 0, 0, 0, 1, 1, 0)$, and so on.

In this way, the time-series input data can be generated based on the pattern data. The learning apparatus 100 can include hidden layer values $x_j$ ($8 \leq j \leq 7+H$) for each time point in the time-series input data, by using sampling. The learning apparatus 100 can be operable to adjust the weight parameter at each time point by repeatedly inputting such time-series input data a plurality of times as training data. The following describes learning results of the learning apparatus 100 using the time-series input data shown in FIG. 9.

Figure 10:
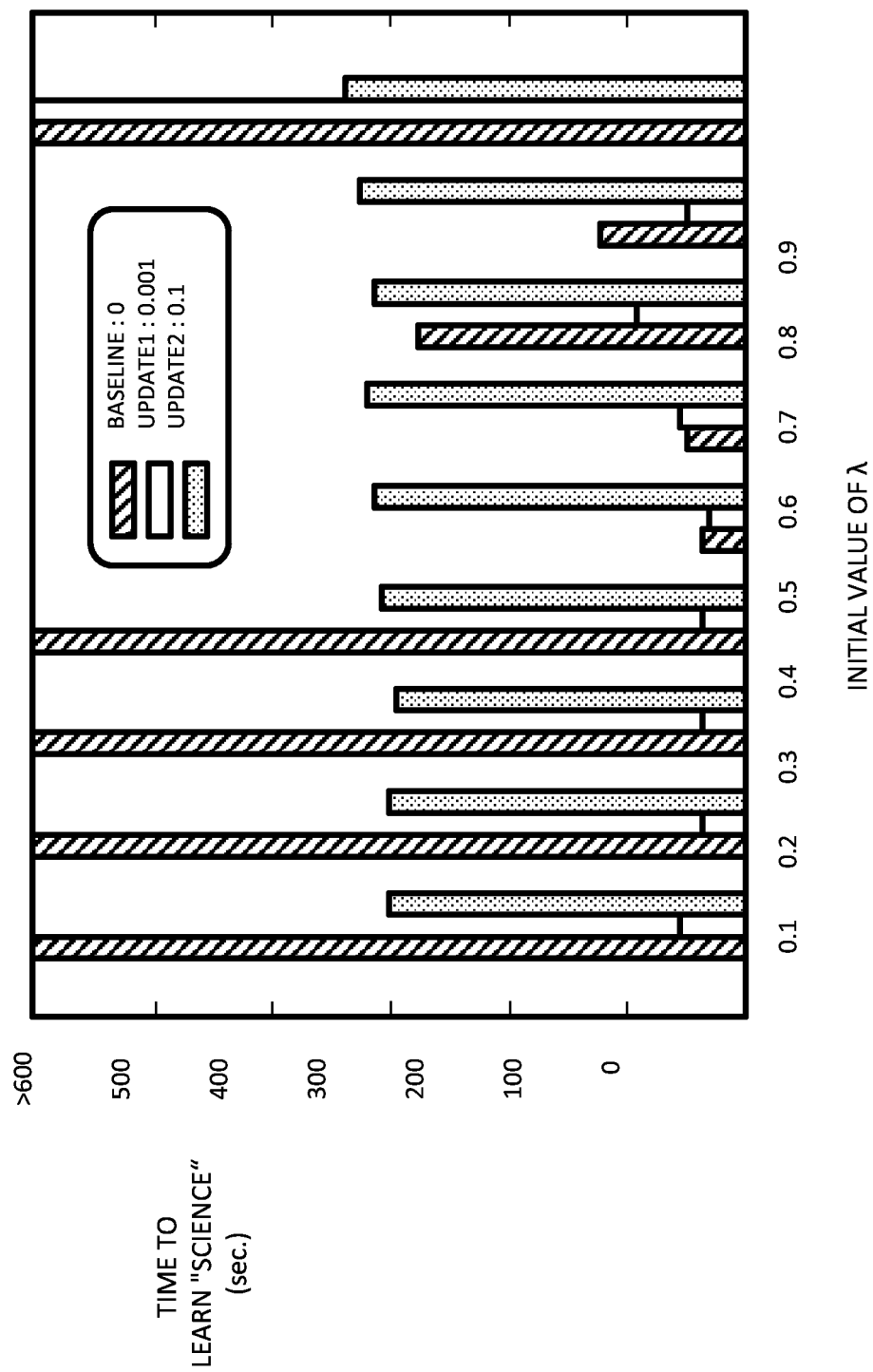
FIG. 10 shows an example of learning results of the learning apparatus 100 according to an embodiment.

FIG. 10 shows an example of learning results of the learning apparatus 100 according to the present embodiment. In FIG. 10, the horizontal axis indicates the initial value of the first predefined parameter $\lambda_k$ and the vertical axis indicates the learning time of the learning apparatus 100. Here, the learning time represents an example of the time needed at each time point until the next piece of input data can be predicted (until the conditional probability becomes highest), according to the time-series input data shown in FIG. 9 being input to the learning apparatus 100.

FIG. 10 shows "BASELINE" as an example of the learning results in a case where the learning apparatus 100 did not update the first predefined parameter $\lambda_k$. It is understood that, if the initial value of the first predefined parameter $\lambda_k$ is from 0.5 to 0.8, the learning apparatus 100 completes the learning within 300 seconds. Furthermore, it is understood that, if this initial value is either of the prescribed values 0.5 and 0.6, the learning apparatus 100 can complete the learning more quickly. On the other hand, it is understood that, if the initial value of the first predefined parameter $\lambda_k$ is from 0.1 to 0.4 or is 0.9, the learning time of the learning apparatus 100 is at least 600 seconds. In this way, there are cases where the learning time of the learning apparatus 100 fluctuates significantly according to the initial value of the first predefined parameter $\lambda_k$.

In contrast to this, the learning results shown as "UPDATE1" and "UPDATE2" in FIG. 10 represent an example of learning results obtained when the learning apparatus 100 updated the first predefined parameter $\lambda_k$. The learning results indicated by "UPDATE1" are results obtained when the first predefined parameter $\lambda_k$ was updated once every 1,000 times that the time-series input data corresponding to the letters "SCIENCE" was input to the learning apparatus 100. It is understood that, even if the initial value of the first predefined parameter $\lambda_k$ is from 0.1 to 0.8, the learning apparatus 100 can complete the learning within 300 seconds.

The learning results indicated by "UPDATE2" are results obtained when the first predefined parameter $\lambda_k$ was updated once every 100 times that the time-series input data corresponding to the letters "SCIENCE" was input to the learning apparatus 100. It is understood that, for all cases where the initial value of the first predefined parameter $\lambda_k$ is from 0.1 to 0.9, the learning apparatus 100 can complete the learning within 300 seconds. In this way, by updating the first predefined parameter $\lambda_k$, the learning apparatus 100 reduces the fluctuation in the learning time for the initial value of the first predefined parameter $\lambda_k$, and can therefore complete the learning operation without adjusting this initial value.

The learning apparatus 100 according to the present embodiment described above is an example in which a common first predefined parameter $\lambda_k$ is set for the sets formed by combinations of a neuron i and a neuron j. Instead, the learning apparatus 100 can allocate a first predefined parameter $\lambda_k$ respectively for each set of one of the plurality of neurons i and one of the plurality of neurons j. In this case, the updating section 170 can be operable, when updating the first update parameter $\lambda_k$, to update the first update parameter $\lambda_k$ for each set of a neuron i and a neuron j. Furthermore, the updating section 170 can be operable to update the first predefined parameter $\lambda_k$ allocated to each set of a neuron i and a neuron j using the first update parameter $\lambda_k$ allocated to the neuron i and the neuron j and the input value error of the neuron j.

In this way, the learning apparatus 100 can set the first predefined parameter $\lambda_k$ for each combination of a neuron i and a neuron j and update these first predefined parameters $\lambda_k$ respectively for the combinations of a neuron i and a neuron j. In this way, the learning apparatus 100 can more suitably update the first predefined parameters $\lambda_k$, and can reduce the fluctuation in the learning time caused by the initial values.

The learning apparatus 100 according to the present embodiment described above is an example in which the updating section 170 updates the first predefined parameter $\lambda_k$. The following describes an example where, instead of or in addition to this, the updating section 170 updates the second predefined parameter $\mu_l$.

The updating section 170 can be operable to update the second predefined parameter $\mu l$ using a second update parameter $\gamma'_{i,l}$ that is based on the update parameter $\gamma_{i,l}$. The updating section 170 can be operable to update the second update parameter $\gamma'_{i,l}{}^{[t]}$ at one time point based on the update parameter $\gamma_{i,l}{}^{[t-1]}$, the second update parameter $\gamma'_{i,l}{}^{[t-1]}$, and the input value $x_i{}^{[t-1]}$ at a previous time point t-1. Furthermore, the updating section 170 can be operable to, when updating the second update parameter $\eta'_{i,l}$ update the second update parameter $\gamma'_{i,l}$ by calculating the product of the second update parameter $\gamma'_{i,l}{}^{[t-1]}$ at the previous time point t-1 and the second predefined parameter $\mu_l$ and adding the update parameter $\gamma_{i,l}{}^{[t-1]}$ and the input value $x_i{}^{[t-1]}$ to the product.

The updating section 170 updates the second update parameter $\gamma'_{i,l}{}^{[t-1]}$ as shown in the following expression, for example.

$$\gamma'_{i,l}{}^{[t]} = \mu_l \gamma'_{i,l}{}^{[t-1]} + \gamma_{i,l}{}^{[t-1]} + x_i{}^{[t-1]} \quad \text{Expression 22:}$$

The updating section 170 can calculate the second update parameter $\gamma'_{i,l}{}^{[t-1]}$ at the previous time point t-1 as shown in the following expression, based om the update parameter $\gamma_{i,l}{}^{[t-1]}$ at the previous time point t-1.

$$\gamma'^{[t-1]}_{i,l} = \frac{\partial}{\partial \mu} \gamma^{[t-1]}_{i,l} = \sum_{s=-\infty}^{t-1}(t-s)\mu_l^{t-s-1}x_i^{[s]} \quad \text{Expression 23}$$

The updating section 170 can be operable to update the second predefined parameter $\mu_l$ as shown in the following expression, using the updated second update parameter $\gamma'_{i,l}$ and input value error. The updating section 170 can be operable to update the second predefined parameter $\mu_l$ further based on the learning parameter $v_{i,j,l}$ and a third update parameter $\beta'_{i,j,l}$, as shown in the following expression.

$$\mu_l \leftarrow \mu_l + \eta_3 \sum_{i,j}(v_{i,j,l}\beta'^{[t-1]}_{i,j,l} + v_{j,i,l}\gamma'^{[t-1]}_{i,j,l})(x_j^{[t]} - \langle X_j^{[t]} \rangle) = \quad \text{Expression 24}$$

$$\mu_l + \eta_3 \Delta \mu_l$$

Here, the third update parameter $\beta'_{i,j,l}$ is a parameter based on the update parameter $\beta_{i,j,l}$. The third update parameter $\beta'_{i,j,l}$ can be calculated as shown in the following expression.

$$\beta'^{[t-1]}_{i,j,l} = \frac{\partial}{\partial \mu}\beta^{[t-1]}_{i,j,l} = \sum_{s=-d+1}^{-1} s\mu_l^{s-1}x_i^{[s+t]} \quad \text{Expression 25}$$

Here, $\eta_3$ may be a constant for adjusting the update amount, in the same manner as $\eta_2$. Instead, $\eta_3$ can be a coefficient whose value becomes smaller according to an increase in the number of updates. As another example, $\eta_3$ can be a coefficient with a value of approximately 1 at a stage when the updating section 170 begins learning and a value that becomes smaller according to further learning as time progresses from the time point t. For example, $\eta_3=\eta_{30}/t^2$. As another example, 113 can be a coefficient whose value becomes smaller according to the update amount. For example, $\eta_3=\eta_{30}/(\Sigma\Delta\mu_l^2)^{1/2}$. Here, $\eta_{30}$ can be a predetermined constant. In this way, the updating section 170 can be operable to calculate the update amount of the second predefined parameter $\mu_l$ based on a learning rate for the update of the second predefined parameter $\mu_l$.

In the same manner as the update of the first predefined parameter $\lambda_k$, the updating section 170 need not update the second predefined parameter $\mu_l$ at every time point. Furthermore, the learning apparatus 100 can set the second predefined parameter $\mu_l$ in common for the combinations of a neuron i and a neuron j, or may instead set a different second predefined parameter $\mu_l$ for each combination of a neuron i and a neuron j.

In the manner described above, the learning apparatus 100 according to the present embodiment can determine the weight parameter and the bias parameter while updating the first predefined parameter $\lambda_k$ and/or the second predefined parameter $\mu_l$. In this way, the learning apparatus 100 can easily set the initial values, and can perform the learning operation more simply.

The learning apparatus 100 according to the present embodiment described above uses a dynamic Boltzmann machine as an example for describing the learning of a model corresponding to data input in time series, but the present invention is not limited to this. The model 10 of the present embodiment is operable to be adopted as a model where a propagation value is propagated from a propagation source node to a propagation destination node, if the model handles coefficients with values that increase or decrease in time series.

For example, a neural network including a plurality of nodes can be adopted. In this case, at least a portion of the neural network can be operable to propagate a first propagation value from a propagation source node corresponding to a neuron i to a propagation destination node corresponding to a neuron j. The neural network can be operable to calculate the first propagation value based on the node value of the propagation source node at a plurality of time points and the weight corresponding to the passage of time points based on a first attenuation coefficient.

At least a portion of the neural network can include a group of neurons corresponding to the model 10 described in FIG. 6. In this case, the neural network can be operable to update the parameters, weights, and the like using an apparatus corresponding to the learning apparatus 100 described in FIG. 5 or the like. The neural network and the model 10 have a correspondence whereby the first propagation value corresponding to the update parameter $\alpha_{i,j,k}$, the first attenuation coefficient corresponds to the first predefined parameter $\lambda_k$, and the weight corresponding to the passage of time points corresponds to the weight corresponding to the first predefined parameter $\lambda_k$. In other words, the neural network can propagate the first propagation value $\alpha_{i,j,k}$ shown in Expression 5.

Such a neural network can also be operable to propagate the first propagation value $\alpha_{i,j,k}$ while updating the first attenuation coefficient $\lambda_k$. In other words, the learning apparatus 100 can be operable to update the first update parameter $\alpha'_{i,j,k}$, which is used to update the first attenuation coefficient $\lambda_k$, by using the first propagation value $\alpha_{i,j,k}$. The update of the first update parameter can be operable to update to the first update parameter $\alpha'i,j,k^{[t]}$ at the one time point t based on a value obtained by calculating the product of the first update parameter $\alpha'_{i,j,k}^{[t-1]}$ at the previous time point t−1 and the first attenuation coefficient $\lambda_k$ and adding the first propagation value $\alpha_{i,j,k}^{[t-1]}$ to the product, as shown in Expression 19.

The learning apparatus 100 can be operable to update the first attenuation coefficient $\lambda_k$ using the updated first update parameter $\alpha'_{i,j,k}$ and the node value error of the propagation destination node. The learning apparatus 100 can be operable to, when updating the first attenuation coefficient $\lambda_k$, update the first attenuation coefficient $\lambda_k$ further based on a first weight for weighting the first propagation value $\alpha_{i,j,k}$ propagated from the propagation source node to the propagation destination node. For example, the learning apparatus 100 can update the first attenuation coefficient $\lambda_k$ as shown in Expression 21, based on the first update parameter $\alpha'_{i,j,k}^{[t-1]}$, the node value error $x_j^{[t]} - \langle X_j^{[t]} \rangle$ of the propagation destination node, and the first weight $u_{i,j,k}$. The first weight is set as a parameter corresponding to the learning parameter $u_{i,j,k}$.

In this way, at least a portion of the neural network corresponds to the model 10 described in FIGS. 5 and 6, and therefore the learning apparatus 100 can be operable to, when updating the first attenuation coefficient $\lambda_k$, calculate the update amount of the first attenuation coefficient $\lambda_k$ based on the learning rate, in the same manner as described above. The learning apparatus 100 can be operable to, when updating the first attenuation coefficient $\lambda_k$, determine whether to update the first attenuation coefficient $\lambda_k$ based on a random number. The first attenuation coefficient $\lambda_k$ can be used in common for the sets formed respectively by one of the plurality of propagation source nodes and one of the plurality of propagation destination nodes, or a first attenuation coefficient $\lambda_k$ can instead be allocated to each set formed respectively by one of the plurality of propagation source nodes and one of the plurality of propagation destination nodes.

The neural network can be operable to propagate each propagation value from one propagation source node to a plurality of propagation destination nodes. In this case, a first attenuation coefficient $\lambda_k$ can be allocated respectively to each of the plurality of propagation source nodes. The learning apparatus 100 can be operable to, when updating the first update parameter $\alpha'_{i,j,k}$, update the first update parameter $\alpha'_{i,j,k}$ for sets of a propagation source node and a propagation destination node. The learning apparatus 100 can be operable to, when updating the first attenuation coefficient $\lambda_k$, update the first attenuation coefficient $\lambda_k$ allocated to one propagation source node using the first update parameter $\alpha'_{i,j,k}$ for each set formed by the one propagation source node and one of the plurality of propagation destination nodes and the node value error of each propagation destination node.

The neural network according to the present embodiment described above is described as an example in which the first propagation value $\alpha_{i,j,k}$ is propagated from a propagation source node to a propagation destination node. Instead of or in addition to this, at least a portion of the neural network can be operable to transmit a second propagation value from a propagation source node to a propagation destination node. In other words, the neural network can be operable to calculate the second propagation value to be propagated from a propagation source node to a propagation destination node based on the values of the propagation source node at a plurality of time points and the weight corresponding to the passage of time points based on a second attenuation coefficient.

For example, the neural network uses a correspondence between the learning apparatus 100 and the model 10, whereby the second propagation value corresponds to the update parameter $\gamma_{i,l}$, the second attenuation coefficient corresponds to the second predefined parameter $\mu_l$, and the weight corresponding to the passage of time points corresponds to the weight corresponding to the second predefined parameter $\mu_l$. In other words, the neural network can propagate the second propagation value $\gamma_{i,l}$ shown in Expression 7.

The neural network can be operable to propagate the second propagation value $\gamma_{i,l}$ while updating the second attenuation coefficient $\mu_l$. The learning apparatus 100 can be operable to update a second update parameter $\gamma'_{i,l}$ that is used for updating the second attenuation coefficient $\mu_l$, using the second propagation value $\gamma_{i,l}$. The update of the second update parameter $y'_{i,l}$ can be operable to update the second update parameter $\gamma'_{i,l}$ based on a value obtained by calculating the product of the second update parameter $y'_{i,l}^{[t-1]}$ at the previous time point and the second attenuation coefficient $\mu_l$ and adding the second propagation value $\gamma_{i,l}$ and the node value of the propagation source node to the product, as shown in Expression 22.

The learning apparatus 100 can be operable to update the second attenuation coefficient $\mu_l$ using the updated second update parameter $\gamma'_{i,l}$ and the error of the value of the propagation destination node. The learning apparatus 100 can be operable to, when updating the second attenuation coefficient $\mu_l$, update the second attenuation coefficient $\mu_l$ further based on a second weight for weighting the second propagation value yi,i propagated from the propagation source node to the propagation destination node. For example, the learning apparatus 100 can update the second attenuation coefficient $\mu_l$ as shown in Expression 24, based on the second update parameter $\gamma'_{i,l}{}^{[t-1]}$, the node value error $x_j^{[t]} - \langle X_j^{[t]} \rangle$ of the destination source node, and the second weight $v_{i,j,l}$. The second weight is set as a parameter corresponding to the learning parameter $v_{i,j,l}$. The learning apparatus 100 can be operable to update the second attenuation coefficient $\mu_l$ further based on a third update parameter $\beta'_{i,j,l}$.

In the manner described above, at least a portion of the neural network according to the present embodiment can be operable to update the first attenuation coefficient $\lambda_k$ and/or the second attenuation coefficient $\mu_l$ while propagating the first propagation value $\alpha_{i,j,k}$ and the second propagation value $\gamma_{i,l}$. The neural network can be operable to propagate a propagation value based on the weighted sum of the first propagation value $\alpha_{i,j,k}$ and the second propagation value $\gamma_{i,l}$ from a propagation source node to a propagation destination node. In this case, the neural network can be equivalent to the model 10 described in FIG. 6.

In other words, the FIFO memory 160 described in FIG. 5 can be a neural network. In this case, as described in FIGS. 1 and 5, the learning apparatus 100 can be operable to sequentially acquire input data at each time point from the time-series input data. The learning apparatus 100 can be operable to shift each node value in an input layer including a plurality of propagation destination nodes to a plurality of propagation source nodes every time input data is acquired, and to input the input values included in the next piece of input data acquired into an input layer including a plurality of propagation destination nodes. The learning apparatus 100 can be operable to calculate the probability of time-series input data occurring or the probability of the next piece of acquired input data occurring, based on a weighted sum obtained by weighting the node values of a plurality of propagation destination nodes with a first propagation value propagated to each of the plurality of propagation destination nodes. In other words, in this case, at least a portion of the neural network can be operable to operate as a dynamic Boltzmann machine that can process time-series data.

In the manner described above, the learning apparatus 100 can be operable to learn for a model using a neural network as well. In this case as well, the learning apparatus 100 can easily set the initial values for the model, and can perform the learning operation more simply.

Figure 11:
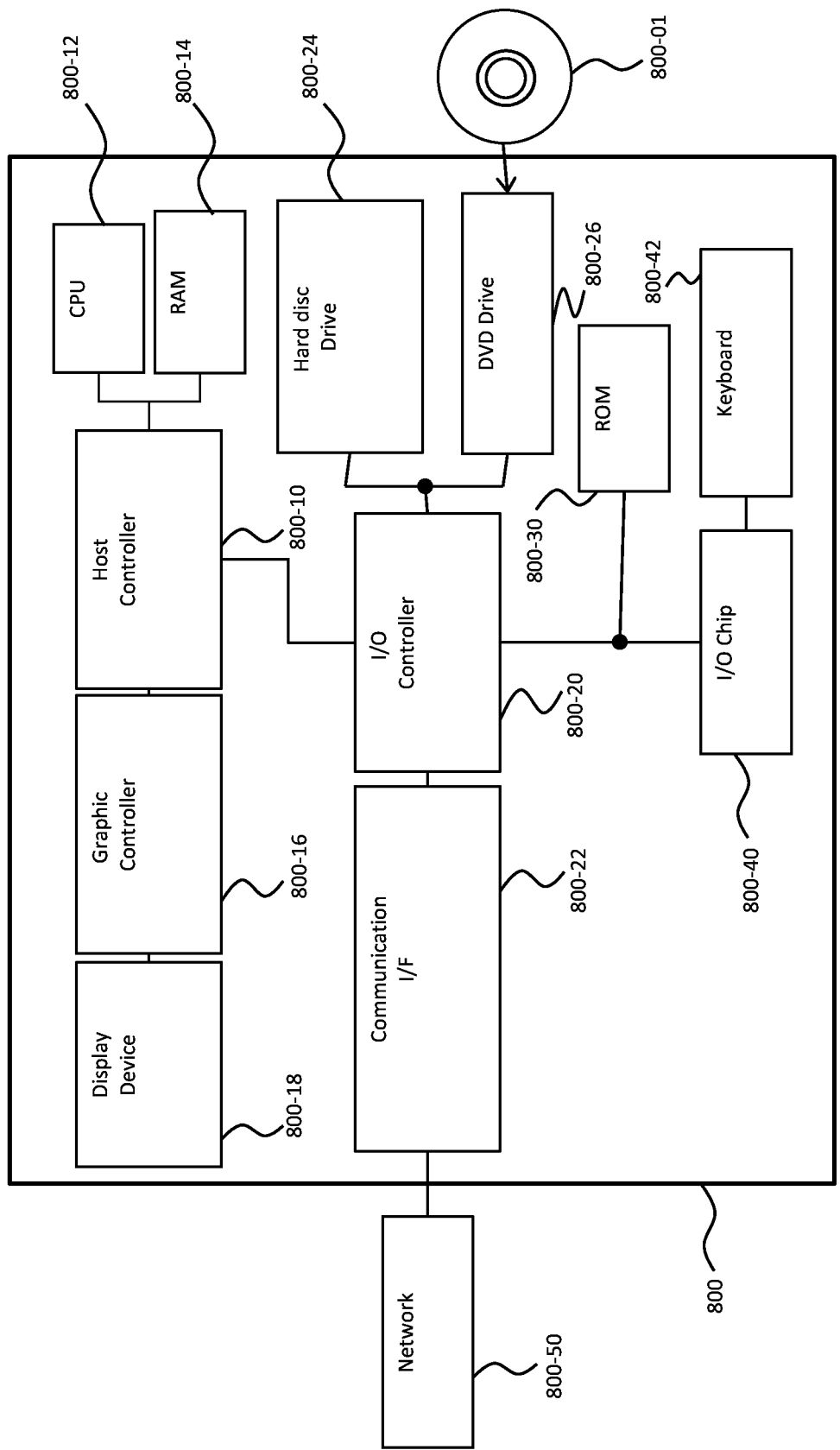
FIG. 11 shows an exemplary hardware configuration of a computer 1900 according to an embodiment of the invention.

FIG. 11 shows an exemplary hardware configuration of a computer configured for cloud service utilization, according to an embodiment of the present invention. A program that is installed in the computer 800 can cause the computer 800 to function as or perform operations associated with apparatuses of the embodiments of the present invention or one or more sections (including modules, components, elements, etc.) thereof, and/or cause the computer 800 to perform processes of the embodiments of the present invention or steps thereof. Such a program can be executed by the CPU 800-12 to cause the computer 800 to perform certain operations associated with some or all of the blocks of flowcharts and block diagrams described herein.

The computer 800 according to the present embodiment includes a CPU 800-12, a RAM 800-14, a graphics controller 800-16, and a display device 800-18, which are mutually connected by a host controller 800-10. The computer 800 also includes input/output units such as a communication interface 800-22, a hard disk drive 800-24, a DVD-ROM drive 800-26 and an IC card drive, which are connected to the host controller 800-10 via an input/output controller 800-20. The computer also includes legacy input/output units such as a ROM 800-30 and a keyboard 800-42, which are connected to the input/output controller 800-20 through an input/output chip 800-40.

The CPU 800-12 operates according to programs stored in the ROM 800-30 and the RAM 800-14, thereby controlling each unit. The graphics controller 800-16 obtains image data generated by the CPU 800-12 on a frame buffer or the like provided in the RAM 800-14 or in itself, and causes the image data to be displayed on the display device 800-18.

The communication interface 800-22 communicates with other electronic devices via a network 800-50. The hard disk drive 800-24 stores programs and data used by the CPU 800-12 within the computer 800. The DVD-ROM drive 800-26 reads the programs or the data from the DVD-ROM 800-01, and provides the hard disk drive 800-24 with the programs or the data via the RAM 800-14. The IC card drive reads programs and data from an IC card, and/or writes programs and data into the IC card.

The ROM 800-30 stores therein a boot program or the like executed by the computer 800 at the time of activation, and/or a program depending on the hardware of the computer 800. The input/output chip 800-40 can also connect various input/output units via a parallel port, a serial port, a keyboard port, a mouse port, and the like to the input/output controller 800-20.

A program is provided by computer readable media such as the DVD-ROM 800-01 or the IC card. The program is read from the computer readable media, installed into the hard disk drive 800-24, RAM 800-14, or ROM 800-30, which are also examples of computer readable media, and executed by the CPU 800-12. The information processing described in these programs is read into the computer 800, resulting in cooperation between a program and the above-mentioned various types of hardware resources. An apparatus or method can be constituted by realizing the operation or processing of information in accordance with the usage of the computer 800-

For example, when communication is performed between the computer 800 and an external device, the CPU 800-12 can execute a communication program loaded onto the RAM 800-14 to instruct communication processing to the communication interface 800-22, based on the processing described in the communication program. The communication interface 800-22, under control of the CPU 800-12, reads transmission data stored on a transmission buffering region provided in a recording medium such as the RAM 800-14, the hard disk drive 800-24, the DVD-ROM 800-01, or the IC card, and transmits the read transmission data to network 800-50 or writes reception data received from network 800-50 to a reception buffering region or the like provided on the recording medium.

In addition, the CPU 800-12 can cause all or a necessary portion of a file or a database to be read into the RAM 800-14, the file or the database having been stored in an external recording medium such as the hard disk drive 800-24, the DVD-ROM drive 800-26 (DVD-ROM 800-01), the IC card, etc., and perform various types of processing on the data on the RAM 800-14. The CPU 800-12 can then write back the processed data to the external recording medium.

Various types of information, such as various types of programs, data, tables, and databases, can be stored in the recording medium to undergo information processing. The CPU 800-12 can perform various types of processing on the data read from the RAM 800-14, which includes various types of operations, processing of information, condition judging, conditional branch, unconditional branch, search/ replace of information, etc., as described throughout this disclosure and designated by an instruction sequence of programs, and writes the result back to the RAM 800-14. In addition, the CPU 800-12 can search for information in a file, a database, etc., in the recording medium. For example, when a plurality of entries, each having an attribute value of a first attribute is associated with an attribute value of a second attribute, are stored in the recording medium, the CPU 800-12 can search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules can be stored in the computer readable media on or near the computer 800. In addition, a recording medium such as a hard disk or a RAM provided in a server system connected to a dedicated communication network or the Internet can be used as the computer readable media, thereby providing the program to the computer 800 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention enable a learning apparatus learning a model corresponding to time-series input data to have higher expressive ability and learning ability and to perform the learning operation more simply.

What is claimed is:

1. A learning method comprising:
   calculating, by a processor, a first propagation value that is propagated from a propagation source node to a propagation destination node in a neural network including a plurality of nodes, based on node values of the propagation source node at a plurality of time points and a weight corresponding to passage of time points based on a first attenuation coefficient;
   updating, by the processor, a first update parameter, which is used for updating the first attenuation coefficient, by using the first propagation value; and
   updating, by the processor, the first attenuation coefficient by using the first update parameter and an error of a node value of the propagation destination node.

2. The learning method according to claim 1, wherein the updating of the first update parameter includes updating the first update parameter based on a value obtained by calculating a product of the first update parameter at a previous time point and the first attenuation coefficient and adding the first propagation value to the product.

3. The learning method according to claim 2, wherein the updating of the first attenuation coefficient includes updating the first attenuation coefficient further based on a first weight for weighting the first propagation value propagated from the propagation source node to the propagation destination node.

4. The learning method according to claim 2, wherein the updating of the first attenuation coefficient includes calculating an update amount of the first attenuation coefficient based on a learning rate.

5. The learning method according to claim 1, wherein the updating of the first attenuation coefficient includes determining whether to update the first attenuation coefficient based on a random number.

6. The learning method according to claim 1, wherein the first attenuation coefficient is used in common for sets that are each formed by one of a plurality of the propagation source nodes and one of a plurality of the propagation destination nodes,
   the updating of the first update parameter includes updating the first update parameter for each set of the propagation source nodes and the propagation destination nodes, and
   the updating of the first attenuation coefficient includes updating the first attenuation coefficient by using the first update parameter for each set of the propagation source nodes and the propagation destination nodes and the error of the node value of each of the propagation destination nodes.

7. The learning method according to claim 1, wherein the first attenuation coefficient is allocated to each of a plurality of the propagation source nodes,
   the updating the first update parameter includes updating the first update parameter for each set of the propagation source nodes and the propagation destination nodes, and
   the updating of the first attenuation coefficient includes updating the first attenuation coefficient allocated to one propagation source node, by using the first update parameter for sets that are each formed by the one propagation source node and a propagation destination node from among the plurality of propagation destination nodes and the error of the node value of each propagation destination node.

8. The learning method according to claim 1, wherein the first attenuation coefficient is allocated to each of a plurality of sets that are each formed by one of a plurality of the propagation source nodes and one of a plurality of the propagation destination nodes,
   the updating of the first update parameter includes updating the first update parameter for each set of the propagation source nodes and the propagation destination nodes, and
   the updating of the first attenuation coefficient includes updating the first attenuation coefficient allocated to a set of one propagation source node and one propagation destination node, by using the first update parameter for the one propagation source node and the one propagation destination node and the error of the node value of the one propagation destination node.

9. The learning method according to claim 1, comprising:
   calculating a second propagation value that is propagated from the propagation source node to the propagation destination node, based on values of the propagation source node at a plurality of time points and a weight corresponding to passage of time points based on a second attenuation coefficient;
   updating a second update parameter, which is used for updating the second attenuation coefficient, by using the second propagation value; and
   updating the second attenuation coefficient by using the second update parameter and an error of the value of the propagation destination node.

10. The learning method according to claim 9, wherein a propagation value based on a weighted sum of the first propagation value and the second propagation value is propagated from the propagation source node to the propagation destination node.

11. The learning method according to claim 9, wherein he updating of the second update parameter includes updating the second update parameter based on a value obtained by calculating a product of the second update parameter at a previous time point and the second attenuation coefficient and adding the second propagation value and the node value of the propagation source node to the product.

12. The learning method according to claim 1, comprising:

sequentially acquiring input data at each time point from time-series input data;

shifting each node value of an input layer including a plurality of the propagation destination nodes to a plurality of the propagation source nodes every time the input data is acquired;

inputting a plurality of node values included in the input data that is acquired next into the input layer included the plurality of propagation destination nodes; and calculating a probability of the time-series input data occurring or a probability of the input data acquired next occurring, based on a weighted sum obtained by weighting the node values of the plurality of propagation destination nodes with the first propagation value propagated to each of the plurality of propagation destination nodes.

13. A computer program product comprising a non-transitory computer readable storage medium having program instructions embodied therewith, the program instructions executable by a computer to cause the computer to perform a method, the method comprising:

calculating, by a processor, a first propagation value that is propagated from a propagation source node to a propagation destination node in a neural network including a plurality of nodes, based on node values of the propagation source node at a plurality of time points and a weight corresponding to passage of time points based on a first attenuation coefficient;

updating, by the processor, a first update parameter, which is used for updating the first attenuation coefficient, by using the first propagation value; and updating, by the processor, the first attenuation coefficient by using the first update parameter and an error of a node value of the propagation destination node.

14. The computer program product according to claim 13, wherein the method further comprises performing:

the updating of the first update parameter by further including updating the first update parameter based on a value obtained by calculating a product of the first update parameter at a previous time point and the first attenuation coefficient and adding the first propagation value to the product.

15. The computer program product according to claim 13, wherein the method further comprises performing:

the updating of the first attenuation coefficient by further including updating the first attenuation coefficient further based on a first weight for weighting the first propagation value propagated from the propagation source node to the propagation destination node.

16. The computer program product according to claim 13, wherein the method further comprises:

sequentially acquiring input data at each time point from time-series input data;

shifting each node value of an input layer including a plurality of the propagation destination nodes to a plurality of the propagation source nodes every time the input data is acquired;

inputting a plurality of node values included in the input data that is acquired next into the input layer included the plurality of propagation destination nodes; and calculating a probability of the time-series input data occurring or a probability of the input data acquired next occurring, based on a weighted sum obtained by weighting the node values of the plurality of propagation destination nodes with the first propagation value propagated to each of the plurality of propagation destination nodes.

17. A learning apparatus for learning a model corresponding to time-series input data, comprising:

a processor configured to:

calculate a first propagation value that is propagated from a propagation source node to a propagation destination node in a neural network including a plurality of nodes, based on node values of the propagation source node at a plurality of time points and a weight corresponding to passage of time points based on a first attenuation coefficient;

update a first update parameter, which is used for updating the first attenuation coefficient, by using the first propagation value; and update the first attenuation coefficient by using the first update parameter and an error of a node value of the propagation destination node.

18. The learning apparatus according to claim 17, wherein the processor is further configured to perform the update of the first update parameter by further including an update of the first update parameter based on a value obtained by calculation of a product of the first update parameter at a previous time point and the first attenuation coefficient and addition of the first propagation value to the product.

19. The learning apparatus according to claim 17, wherein the processor is further configured to perform the update of the first attenuation coefficient by further including an update of the first attenuation coefficient further based on a first weight for weighting the first propagation value propagated from the propagation source node to the propagation destination node.

20. The learning apparatus according to claim 17, wherein the processor is further configured to:

sequentially acquire input data at each time point from time-series input data;

shift each node value of an input layer including a plurality of the propagation destination nodes to a plurality of the propagation source nodes every time the input data is acquired;

input a plurality of node values included in the input data that is acquired next into the input layer including the plurality of propagation destination nodes; and calculate a probability of the time-series input data occurring or a probability of the input data acquired next occurring, based on a weighted sum obtained by weighting the node values of the plurality of propagation destination nodes with the first propagation value propagated to each of the plurality of propagation destination nodes.

* * * * *